US012656875B2

(12) United States Patent
Colascione et al.

(10) Patent No.: US 12,656,875 B2
(45) Date of Patent: Jun. 16, 2026

(54) MULTIMODAL UI WITH SEMANTIC EVENTS

(71) Applicant: Snap Inc., Santa Monica, CA (US)

(72) Inventors: Daniel Colascione, Melbourne Beach, FL (US); Daniel Harris, San Francisco, CA (US); Andrei Rybin, Lehi, UT (US); Anoosh Kruba Chandar Mahalingam, Sunnyvale, CA (US); Pierre-Yves Santerre, Bellevue, WA (US); Jennica Pounds, Cape Coral, FL (US)

(73) Assignee: Snap Inc., Santa Monica, CA (US)

( * ) Notice: Subject to any disclaimer, the term of this patent is extended or adjusted under 35 U.S.C. 154(b) by 33 days.

(21) Appl. No.: 18/307,260

(22) Filed: Apr. 26, 2023

(65) Prior Publication Data

US 2023/0341948 A1     Oct. 26, 2023

Related U.S. Application Data

(60) Provisional application No. 63/363,732, filed on Apr. 28, 2022, provisional application No. 63/334,841, filed on Apr. 26, 2022.

(51) Int. Cl.
| | |
|---|---|
| *G06F 3/01* | (2006.01) |
| *G02B 27/01* | (2006.01) |
| *G06T 19/00* | (2011.01) |

(52) U.S. Cl.
CPC ......... *G06F 3/017* (2013.01); *G02B 27/0172* (2013.01); *G06T 19/006* (2013.01); *G02B 2027/0178* (2013.01)

(58) Field of Classification Search
None
See application file for complete search history.

(56) References Cited

U.S. PATENT DOCUMENTS

| | | |
|---|---|---|
| 7,971,156 B2 | 6/2011 | Albertson et al. |
| 7,996,793 B2 | 8/2011 | Latta et al. |

(Continued)

FOREIGN PATENT DOCUMENTS

| | | |
|---|---|---|
| CN | 103049761 B | 8/2016 |
| CN | 119072675 A | 12/2024 |

(Continued)

OTHER PUBLICATIONS

"International Application Serial No. PCT US2023 019922, International Search Report mailed Jul. 12, 2023", 5 pgs.

(Continued)

*Primary Examiner* — Ifedayo B Iluyomade
(74) *Attorney, Agent, or Firm* — Schwegman Lundberg & Woessner, P.A.

(57) ABSTRACT

An AR system includes multiple input-modalities. A hand-tracking pipeline supports Direct Manipulation of Virtual Object (DMVO) and gesture input methodologies. In addition, a voice processing pipeline provides for speech inputs. Direct memory buffer access to preliminary hand-tracking data, such as skeletal models, allows for low latency communication of the data for use by DMVO-based user interfaces. A system framework component routes higher level hand-tracking data, such as gesture identification and symbols generated based on hand positions, via a Snips protocol to gesture-based user interfaces.

21 Claims, 16 Drawing Sheets

(56) References Cited

U.S. PATENT DOCUMENTS

| | | | |
|---|---|---|---|
| 8,487,938 | B2 | 7/2013 | Latta et al. |
| 8,856,691 | B2 | 10/2014 | Geisner et al. |
| 9,225,897 | B1 | 12/2015 | Sehn et al. |
| 9,230,160 | B1 | 1/2016 | Kanter |
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,614,855 | B2 | 4/2020 | Huang |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 12,282,607 | B2 * | 4/2025 | Vaday ................ G02B 27/0101 |
| 2009/0012788 | A1 | 1/2009 | Gilbert et al. |
| 2011/0301934 | A1 | 12/2011 | Tardif |
| 2014/0171036 | A1 | 6/2014 | Simmons |
| 2015/0120293 | A1 | 4/2015 | Wohlert et al. |
| 2015/0370320 | A1 | 12/2015 | Connor |
| 2016/0187654 | A1 | 6/2016 | Border et al. |
| 2017/0123487 | A1 | 5/2017 | Hazra et al. |
| 2017/0277684 | A1 | 9/2017 | Dharmarajan Mary |
| 2017/0277685 | A1 | 9/2017 | Takumi |
| 2017/0351910 | A1 | 12/2017 | Elwazer et al. |
| 2018/0158370 | A1 | 6/2018 | Pryor |
| 2019/0094966 | A1 * | 3/2019 | Kulkarni ............... G06T 19/006 |
| 2021/0011612 | A1 | 1/2021 | Dancie et al. |
| 2021/0074016 | A1 | 3/2021 | Li et al. |
| 2021/0132781 | A1 | 5/2021 | Daniels et al. |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0397000 | A1 | 12/2021 | Rodriguez, II |
| 2021/0405761 | A1 * | 12/2021 | Canberk ............. G06F 3/04815 |
| 2022/0188539 | A1 * | 6/2022 | Chan ...................... G06V 10/95 |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0326781 | A1 | 10/2022 | Hwang et al. |
| 2022/0334649 | A1 | 10/2022 | Hwang et al. |

FOREIGN PATENT DOCUMENTS

| | | | |
|---|---|---|---|
| EP | 3707693 | A1 | 9/2020 |
| KR | 20220158824 | A | 12/2022 |
| WO | WO-2016168591 | A1 | 10/2016 |
| WO | WO-2019094618 | A1 | 5/2019 |
| WO | WO-2022005687 | A1 | 1/2022 |
| WO | WO-2022005693 | A1 | 1/2022 |
| WO | WO-2022060549 | A2 | 3/2022 |
| WO | WO-2022066578 | A1 | 3/2022 |
| WO | WO-2022132381 | A1 | 6/2022 |
| WO | WO-2022146678 | A1 | 7/2022 |
| WO | WO-2022198182 | A1 | 9/2022 |
| WO | WO-2022216784 | A1 | 10/2022 |
| WO | WO-2022225761 | A1 | 10/2022 |
| WO | WO-2022245765 | A1 | 11/2022 |
| WO | WO-2023212014 | A1 | 11/2023 |

OTHER PUBLICATIONS

"International Application Serial No. PCT US2023 019922, Written Opinion mailed Jul. 12, 2023", 7 pgs.

"International Application Serial No. PCT/US2023/019922, International Preliminary Report on Patentability mailed Nov. 7, 2024", 9 pgs.

"European Application Serial No. 23724588.1, Response to Communication pursuant to RUles 161 and 162 EPC filed May 13, 2025", 9 pgs.

"Korean Application Serial No. 10-2024-7039332, Notice of Preliminary Rejection mailed Dec. 1, 2025", W English Translation, 10 pgs.

* cited by examiner

528

MULTIMODAL UI WITH SEMANTIC EVENTS

CLAIM OF PRIORITY

This application claims the benefit of priority to U.S. Provisional Application Ser. No. 63/334,841, filed on Apr. 26, 2022, and U.S. Provisional Application Ser. No. 63/363,732, filed on Apr. 28, 2022, each of which are incorporated herein by reference in their entireties.

TECHNICAL FIELD

The present disclosure relates generally to user interfaces and, more particularly, to user interfaces used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn device may access and use computer software applications to perform various tasks or engage in an entertaining activity. Performing the tasks or engaging in the entertaining activity may include entry of text. To enter the text, the user interacts with a text entry user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
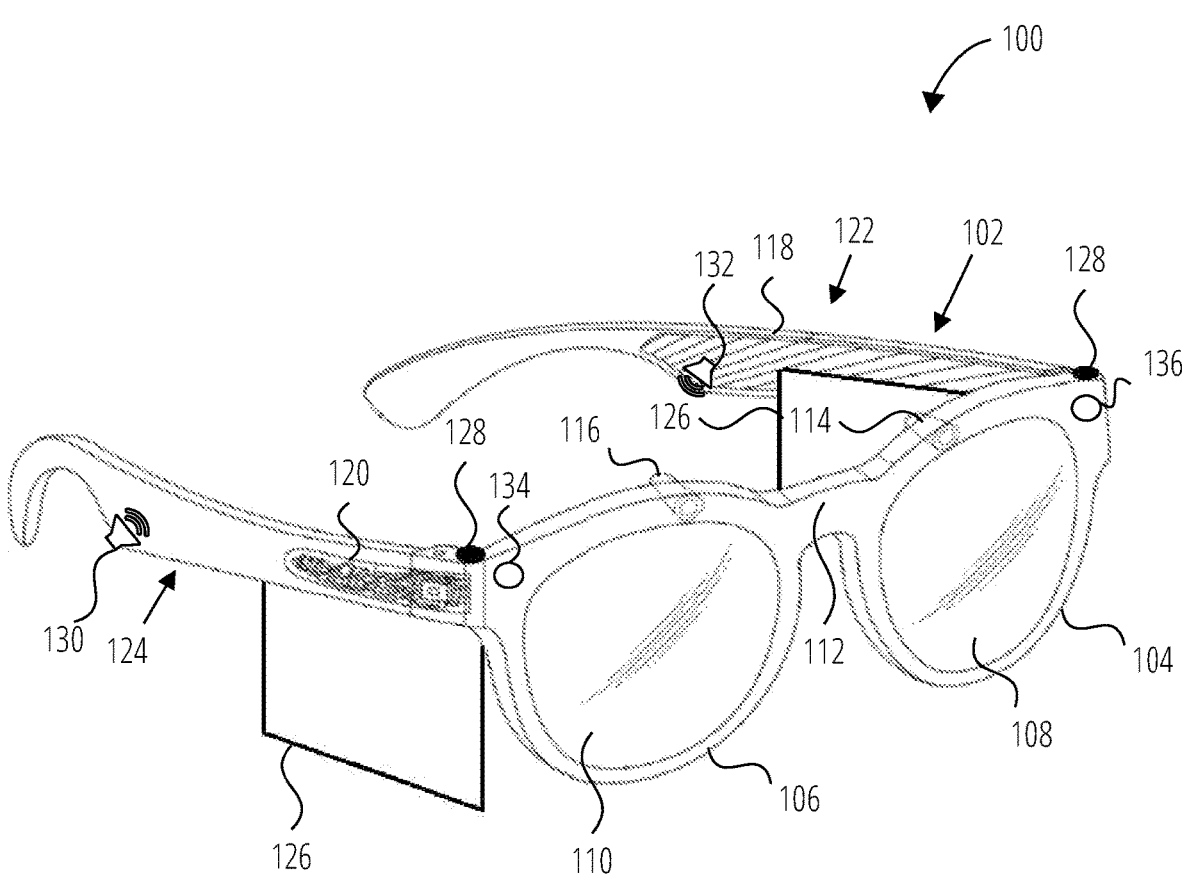
FIG. 1 is a perspective view of a head-worn device, in accordance with some examples.

AR systems are limited when it comes to available user input modalities. As compared with other mobile devices, such as mobile phones, it is more complicated for a user of an AR system to indicate user intent and invoke an action or application. When using a mobile phone, a user may go to a home screen and tap on a specific icon to start an application. However, because of a lack of a physical input device such as a touchscreen or keyboard, such interactions are not as easily performed on an AR system. Typically, users can indicate their intent by pressing a limited number of hardware buttons or using a small touchpad. However, such operations usually detract from the overall enjoyment and experience and can involve navigating away from a current interface which consumes a great deal of resources and time.

In some examples, an input modality that may be utilized with AR systems is hand-tracking combined with Direct Manipulation of Virtual Objects (DMVO) where a user is provided with a user interface that is displayed to the user in an AR overlay having a 2D or 3D rendering. The rendering is of a graphic model in 2D or 3D where virtual objects located in the model correspond to interactive elements of the user interface. In this way, the user perceives the virtual objects as objects within an overlay in the user's field of view of the real-world scene while wearing the AR system, or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects.

In additional examples, gestures made by a user that do not involve DMVO methodologies provide another input modality suitable for use with AR systems. Gesture inputs are made by a user moving and positioning portions of the user's body while those portions of the user's body are detectable by an AR system while the user is wearing the AR system. The detectable portions of the user's body may include portions of the user's upper body, arms, hands, and fingers. Components of a gesture input may include the movement of the user's arms and hands, location of the user's arms and hands in space, and positions in which the user holds their upper body, arms, hands, and fingers. Gesture inputs are useful in providing an AR experience for a user as they offer a way of providing user inputs into the AR system during an AR experience without having the user take their focus off of the AR experience. As an example, in an AR experience that is an operational manual for a piece of machinery, the user may simultaneously view the piece of machinery in the real-world scene through the lenses of the AR system, view an AR overlay on the real-world scene view of the machinery, and provide user inputs into the AR system.

In additional examples, audio or voice inputs provide another input modality. Voice commands spoken by a user during an AR experience are treated as user inputs into a voice user interface.

In some examples, by combining voice, DMVO, and gesture input modalities, improved user interfaces are provided to a user of an AR system.

In some examples, an Application Programming Interface (API) is provided whereby input events are easy to consume for AR applications as semantic event, meaning AR applications can simply register for an event they want to listen to and accordingly consume the event transparently.

In some examples, audio processing can be performed in multiple components of an AR system, such as a frameworks layer, an application layer, and in the cloud via a cloud-based voice recognition and Natural Language Processing (NLP) backend.

In some examples, an AR system provides a framework for modality agnosticism through a general-purpose input system in which hand-based input is one of several choices of input modality.

In some examples, an AR system provides an organizational scheme for input recognition, processing, and dispatch at the level of the operating system as a whole and reserves the specific realization of device input for device and interaction designers.

In some examples, an AR system provides generic and standardized semantic events with the option of applications using "escape hatches" to consume raw, modality-specific input data when appropriate.

In some examples, an AR system provides a hand-tracking input pipeline functions as a client of a general-purpose camera service component, continuously processing buffers of frame data and inferring a skeletal model that it continually updates. The skeletal model (published as a subnet IP address (Snips) automatically synchronized shared-memory buffer) is then consumed by components that interpret the inputs at increasingly greater levels of abstraction. The hand-tracking input pipeline terminates with modules that recognize general-purpose gestures and text editing operations in the hand classifier stream, internally maintaining enough history to integrate a short history into the respective type of recognized gesture. At the moment a recognizer module recognizes a gesture of some kind, it informs the appropriate framework-level service (e.g., a system framework component) via an inter-System on Chip (SoC) Snips call. This part of the hand-tracking input pipeline is independent of an operating system's AR application component model.

In some examples, an AR system provides a voice input pipeline that continuously processes audio data to detect voice commands. The voice input pipeline generates semantic event data comprising the voice command and communicates the voice commands to an AR application component.

In some examples, an AR system provides a system framework component that receives high-level (i.e. symbols and gestures) but untargeted (not correlated with a specific AR application) input events, along with metadata, and figures out the process for which that event is intended. After determining the target of a gesture input event, the system framework component forwards the event as a Snips method call to the process intended to receive it. The indirection through the system framework component provides security. If the OS runs multiple untrusted applications, the system framework component routes inputs according to their intended recipient.

In some examples, an AR system provides a skeletal model inference component that publishes skeleton samples as Snips shared memory buffers, allowing for consumers to read each processed skeleton update with the lowest possible latency. AR applications that opt to consume raw hand skeleton samples instead of "cooked" gesture input events read from that same hand skeleton shared memory buffer, again minimizing latency and facilitating operations that want to closely correlate graphics and hand movement observations.

In some examples, an AR system provides a system framework component that knows which AR applications are visible or somehow otherwise available for input, and it knows which specific gestures made up which specific hand classifiers these AR applications expect to receive. The system framework component uses high-level user context information from the operating system framework to guide the lower-level inference systems.

In some examples, an AR system provides multiple feedback channels so that the AR system as a whole has more information about the user's likely behavior than any single component in isolation, allowing reading of user signals closer to the "noise floor" by using multiple components of the AR system to estimate whether any particular interpretation of user input is correct.

In some examples, an AR system provides facilities to support Direct Manipulation of Virtual Objects (DMVO) where a user uses their hands to interact with virtual objects as if they were physical objects. To do so, the AR system provides a continuously-updated hand skeletal model that includes hand configuration information (e.g., joint angles), and a continuously-updated transformation from the skeletal model coordinate system to the device user coordinate system. The continuously-updated hand skeletal model is an output of one of the earlier stages of the hand input data processing pipeline delivered to AR applications without higher-level semantic interpretation.

In some examples, an AR system provides for directed gestures involving users issuing commands, indicated as hand gestures composed of hand classifiers, at targets. A target can be a specific virtual object or the system as a whole, and targets describe which gestures they would like to recognize.

In some examples, an AR system provides for the use of hand classifiers as gesture building blocks allowing application developers to specify gestures in terms of combinations of hand classifiers. The AR system processes hand classifier extraction from the hand tracking data stream in a layer distinct from assembly of hand movements into gestures, an AR application can utilize newly created signs built out of existing gestures without having to re-train machine learning components of a hand-tracking input system.

In some examples, an AR system provides for specified gestures to become standardized across AR applications and scenarios. In some examples, an OS as a whole might support a generalized "back" gesture that activates a system-level user interface for switching between applications in some manner. Accordingly, a hand classifier system provided by the AR system allows the building of an interaction language out of reusable, modular components that free developers from employing re-training of machine learning models to provide a new command or action.

In some examples, an AR system provides for custom gestures utilizing hand classifiers allowing developers of AR applications to create task-specific gestures without requiring that the hand-tracking input pipeline itself be modified or re-trained. In some examples, a database-exploration application describes a language of gestures specialized for expressing data transformation operations of some sort, allowing users to "move" through the data by simply forming certain hand shapes instead of selecting menu items or tapping buttons as they would in the mobile or desktop world. In some examples, a relationship between hand classifiers and gestures is the same as the relationship between letters and words and the hand classifier system allows recognition of novel gestures made up of already known hand classifiers. In additional examples, a large number of novel gestures are made combinatorically from a fixed classifier set.

In some examples, an AR system provides recognition of directed gesture input in both "on screen" and "off screen" scenarios. Gestures may be made off-screen with the hands in a comfortable and discreet position.

In some examples, an AR system allows users to enter non-trivial amounts of text in a sustainable, reliable fashion via a platform-level API provided in the operating system.

In some examples, an AR system generates input event data using input data captured by an input device of the AR system. The AR system determines a target AR application component of the AR system using the input event data and component registration data of one or more AR application components of the AR system and communicates to the target AR application component, the input data.

In some examples, the input event data comprises gesture input data of a gesture being made by a user of the AR system.

In some examples, the input event data comprises symbol input data of a fingerspelling sign being made by a user of the AR system.

In some examples, the input event data is generated by a hand-tracking input pipeline of the AR system.

In some examples, the input event data comprises a voice command being made by a user of the AR system.

In some examples, the input event data is generated by a voice input pipeline of the AR system.

In some examples, the voice input pipeline comprises a voice Machine Learning (ML) service.

FIG. 1 is a perspective view of an AR system in a form of a head-worn device (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 1002 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include one or more cameras, such as a first or left camera 114 and a second or right camera 116. The one or more cameras are operable as visual input devices to capture real-world scene images as well as images of a user's hands as the user makes gestures. The Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

In some examples, the glasses 100 further comprise one or more audio speakers, such as audio speakers 130 and 132. The one or more audio speakers may include, but are not limited to, earphones, earbuds, headsets, in-ear monitors, canalphones, wireless earbuds, over-ear headphones, on-ear headphones, or the like. The audio speakers are operable to provide audio signals to the user, such as voice or speech prompts or messages.

In some examples, the glasses 100 further comprise one or more audio input devices, such as one or more microphones as exemplified by microphone 134 and microphone 136. The one or more audio input devices are operable to capture the speech or voice commands of the user.

Figure 2:
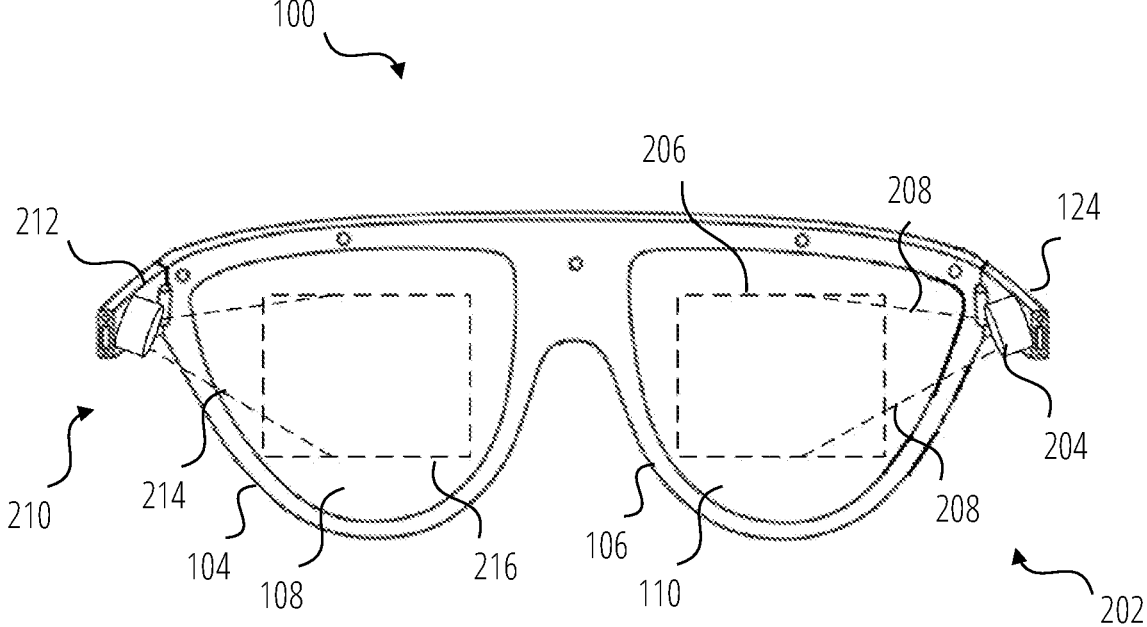
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g., client device 1026 illustrated in FIG. 10), and/or hand movements, locations, and positions detected by the glasses 100.

Figure 3:
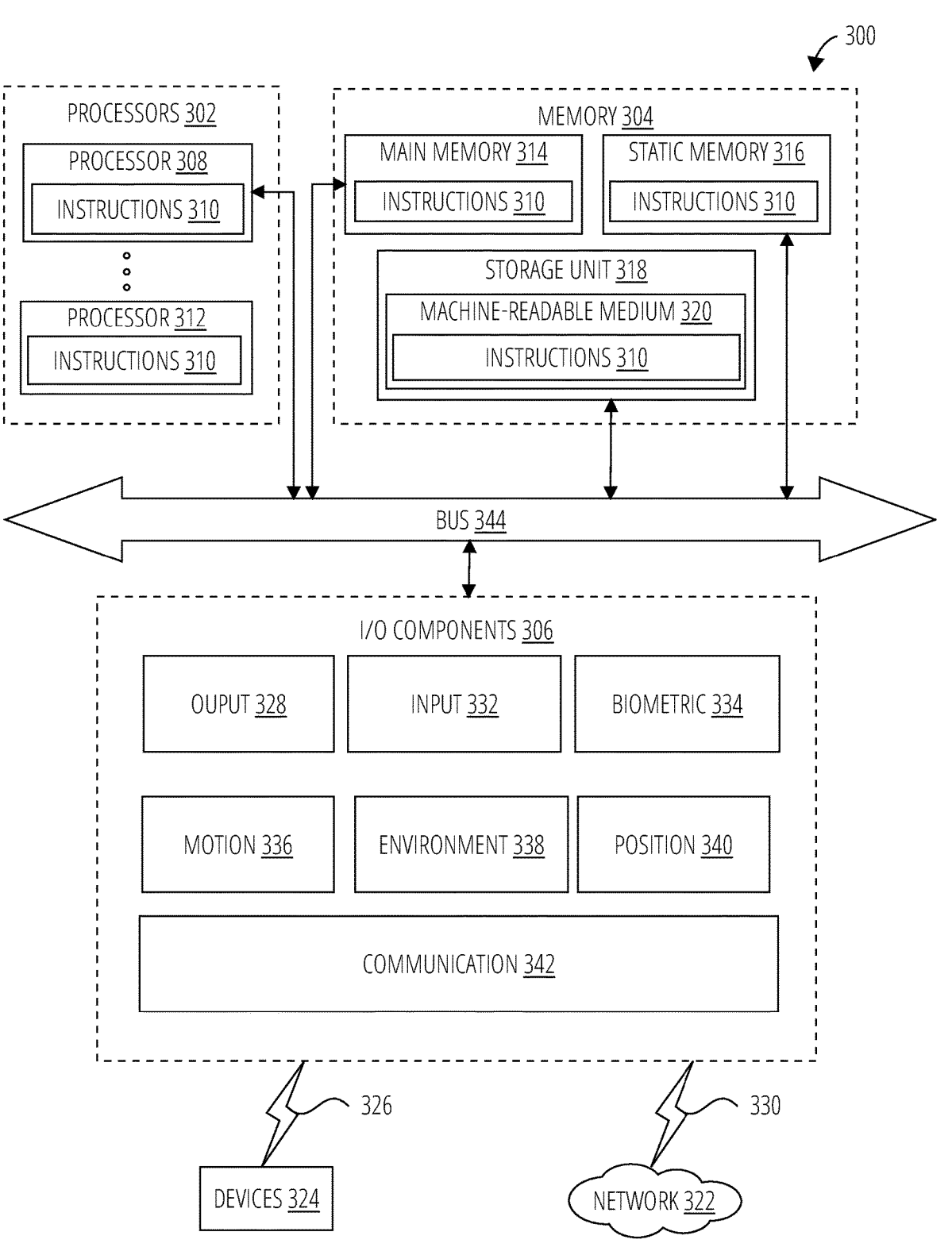
FIG. 3 is a diagrammatic representation of a machine, in the form of a computing apparatus within which a set of instructions may be executed for causing the machine to perform any one or more of the methodologies discussed herein, in accordance with some examples.

FIG. 3 is a diagrammatic representation of a machine 300 (such as a computing apparatus) within which instructions 310 (e.g., software, a program, an application, an applet, an app, or other executable code) for causing the machine 300 to perform any one or more of the methodologies discussed herein may be executed. The machine 300 may be utilized as a computer 120 of glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O components 306, which may be configured to communicate with one another via a bus 344. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the machine 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 306 may include biometric components 334, motion components 336, environmental components 338, or position components 340, among a wide array of other components. For example, the biometric components 334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units (IMUs), acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 306 further include communication components 342 operable to couple the machine 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4A:
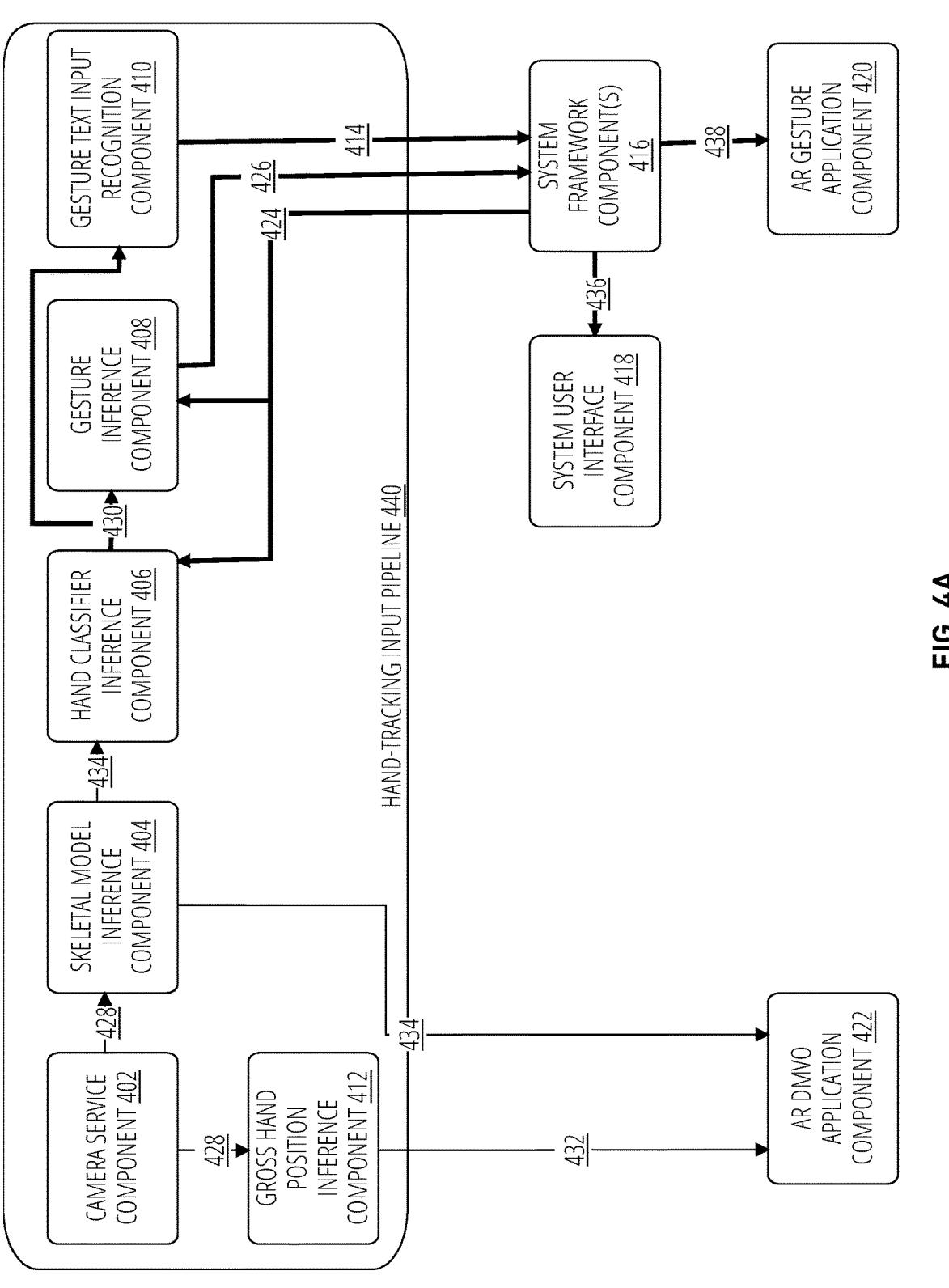
FIG. 4A is collaboration diagram of a hand-tracking input pipeline of an AR system, such as glasses, in accordance with some examples.
Figure 4B:
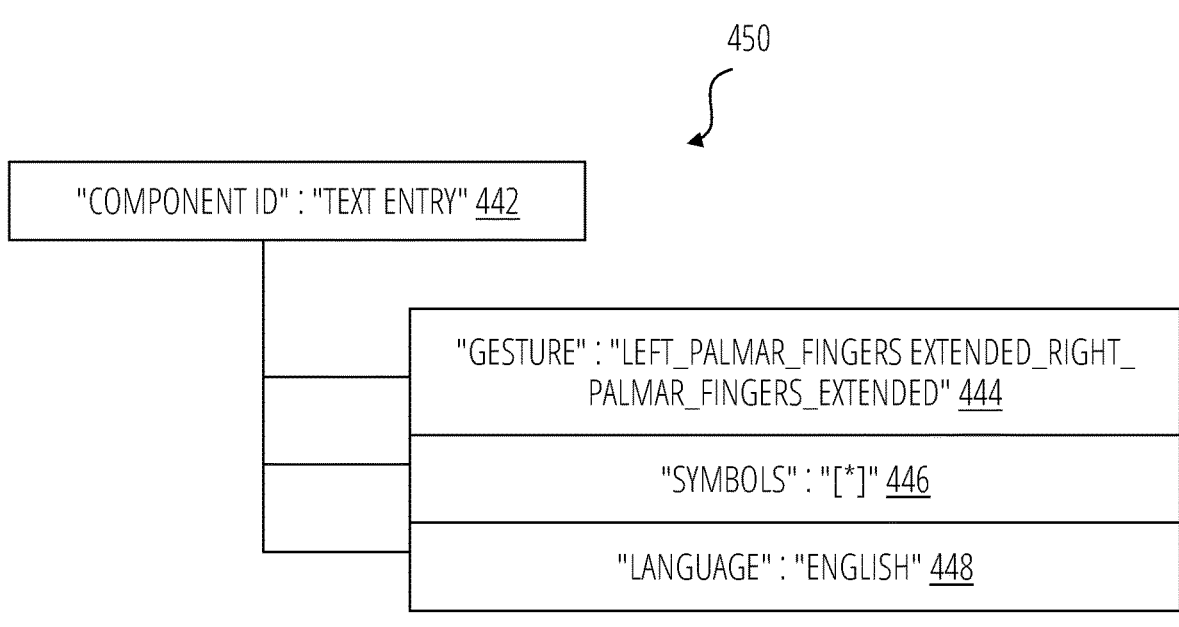
FIG. 4B is an illustration of a data structure, in accordance with some examples.
Figure 4C:
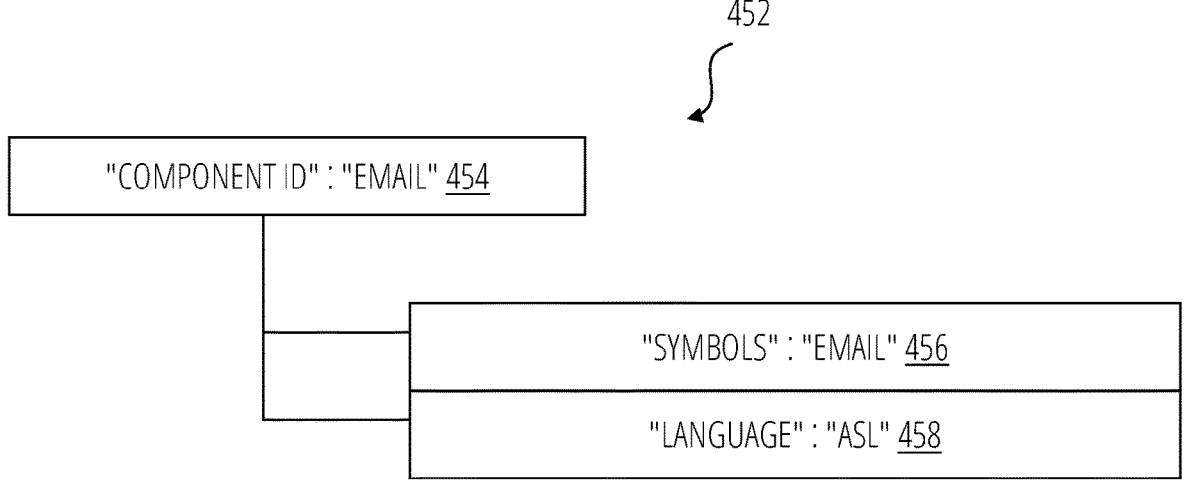
FIG. 4C is an illustration of another data structure, in accordance with some examples.

FIG. 4A is collaboration diagram of a hand-tracking input pipeline 440 of an AR system, such as glasses 100, and FIG. 4B and FIG. 4C are illustrations of data structures in accordance with some examples. A camera service component 402 generates real-world scene environment frame data 428 of a real-world scene environment from a perspective of a user of the AR system using one or more cameras of the AR system, such as cameras 114 and 116 of FIG. 1. The one or more cameras function as visual input devices into the hand-tracking input pipeline 440. The camera service component 402 communicates the real-world scene environment frame data 428 to a skeletal model inference component 404. Included in the real-world scene environment frame data 428 are tracking video frame data of detectable portions of the user's body including portions of the user's upper body, arms, hands, and fingers. The tracking video frame data includes video frame data of movement of portions of the user's upper body, arms, hands, and fingers as the user makes a gesture or moves their hands and fingers to interact with a real-world scene environment; video frame data of locations of the user's arms and hands in space as the user makes the gesture or moves their hands and fingers to interact with the real-world scene environment; and video frame data of positions in which the user holds their upper body, arms, hands, and fingers as the user makes the gesture or moves their hands and fingers to interact with the real-world scene environment.

The skeletal model inference component 404 receives the real-world scene environment frame data 428 and generates skeletal model data 434 based on the real-world scene environment frame data 428. The skeletal model data 434 includes data of geometric skeletal models representing one or more portions of the user's upper body, arms, hands, and fingers. In some examples, the skeletal model inference component 404 extracts features of the user's upper body, arms, and hands from the tracking video frame data included in the real-world scene environment frame data 428. The extracted features may include landmark data including landmark identification, location in the real-world scene environment, and categorization information of one or more landmarks associated with the user's upper body, arms, and hands. The skeletal model inference component 404 generates the skeletal model data 434 based on the extracted features using geometric methodologies and one or more previously generated skeletal models. In additional examples, the skeletal model inference component 404 generates the skeletal model data 434 on the basis of categorizing the real-world scene environment frame data 428 using artificial intelligence methodologies and one or more skeletal models previously generated using machine learning methodologies.

The skeletal model inference component 404 communicates the skeletal model data 434 to the hand classifier inference component 406. In addition, the skeletal model inference component 404 makes the skeletal model data 434 available to an application being executed on the AR system, such as AR DMVO application component 422.

The camera service component 402 communicates the real-world scene environment frame data 428 to a gross hand position inference component 412. The gross hand position inference component 412 generates coordinate transformation data 432 based on the real-world scene environment frame data 428. The coordinate transformation data 432 includes a continuously-updated transformation from a coordinate system of a skeletal model of the skeletal model data 434 and a coordinate system of the AR system's user coordinate system. In an example, the object gross hand position inference component 412 receives real-world scene video real-world scene environment frame data 428 of a real-world scene environment and extracts features of objects in the real-world scene environment including the user's upper body, arms, and hands from the real-world scene environment video frame data. The object gross hand position inference component 412 generates coordinate transformation data 432 based on the extracted features. The gross hand position inference component 412 communicates the coordinate transformation data 432 to the AR DMVO application component 422.

The hand classifier inference component 406 receives the skeletal model data 434 from the skeletal model inference component 404 and generates hand classifier probability data 430 based on the skeletal model data 434. In some examples, gestures are specified by the hand-tracking input pipeline 440 in terms of combinations of hand classifiers. The hand classifiers are in turn composed of combinations and relationships of features of the skeletal models included in the skeletal model data 434. In some examples, the hand classifier inference component 406 compares one or more skeletal models included in skeletal model data 434 to previously generated hand classier hand classifier models and generates one or more hand classifier probabilities based on the comparison. The one or more hand classifier probabilities indicate a probability that a specified hand classifier can be identified from the skeletal model data 434. The hand classifier inference component 406 generates hand classifier probability data 430 based on the one or more hand classifier probabilities. In additional examples, the hand classifier inference component 406 determines the one or more hand classifier probabilities on the basis of categorizing the skeletal model using artificial intelligence methodologies and a hand classifier model previously generated using machine learning methodologies.

In some examples, the hand-tracking input pipeline 440 determines hand classifiers from the skeletal model data 434 in a layer distinct from determination of gestures from hand movements made by a user of an AR system. Accordingly, a designer of an AR application component executed by the AR system may create new gestures built out of existing hand classifiers composing already known gestures without having to retrain machine learning components of the hand-tracking input pipeline 440 or generate implementation specific hand classifier models. In some examples, a hand classifier model used to generate the hand classifier probability data 430 is not implementation specific. That is, the hand classifier model is not trained to recognize only specific hand classifiers for the purposes of a specific implementation. Instead, the hand classifier model is trained to recognize as many hand classifiers as possible without regard to what those hand classifiers signify in the context of a specific implementation such as a task specific AR application component.

The hand classifier inference component 406 communicates that hand classifier probability data 430 to a gesture inference component 408 and a gesture text input recognition component 410. The gesture inference component 408 receives the hand classifier probability data 430 and generates semantic event data in the form of gesture input data 426 based on the hand classifier probability data 430. In an example, the gesture inference component 408 compares hand classifiers identified in the hand classifier probability data 430 to gesture identification data identifying specific gestures. A gesture identification is composed of one or more hand classifiers that correspond to a specific gesture. A gesture identification is defined using a grammar whose symbols correspond to hand classifiers. For example, a gesture identification for a gesture is "LEFT_PAL-MAR_FINGERS EXTENDED_RIGHT PALMAR_FIN-GERS_EXTENDED" where: "LEFT" is a symbol corresponding to a hand classifier indicating that the user's left hand has been detected; "PALMAR" is a symbol corresponding to a hand classifier indicating that a palm of a hand of the user has been detected and modifies "LEFT" to indicate that the user's left hand palm has been detected; "FINGERS" is a symbol corresponding to a hand classifier indicating that the user's fingers have been detected; and "EXTENDED" is a symbol corresponding to a hand classifier indicating that the user's fingers are extended and modifies "FINGERS". In additional examples, a gesture identification is a single token, such as a number, identifying a gesture based on the gesture's component hand classifiers. A gesture identification identifies a gesture in the context of a physical description of the gesture. The gesture inference component 408 communicates the 426 to a system framework component 416.

The gesture inference component 408 communicates the gesture input data 426 to the system framework component 416. The system framework component 416 receives gesture input data 426 and generates directed input event data 438 or directed input event data 438 based on the gesture input data 426 and on. The input events of directed input event data 438 may be one class of multiple classes. Undirected input events belonging to an undirected class are routed to operating system level components such as system user interface component 418. Directed input events belonging to a directed class are routed to a specific component such as AR gesture application component 420. In some examples, the system framework component 416 handles all incoming input events such as, but not limited to, voice commands received from a user, keypad or button presses received from a user, and the like.

The gesture text input recognition component 410 receives the hand classifier probability data 430 and generates semantic event data in the form of symbol input data

414 based on the hand classifier probability data 430. In an example, the gesture inference component 408 compares hand classifiers identified in the hand classifier probability data 430 to symbol data identifying specific characters, words, and commands. For example, symbol data for a gesture is the character "V" as a gesture that is a finger-spelling sign in American Sign Language (ASL). The individual hand classifiers for the gesture may be "LEFT" for left hand, "PALMAR" for the palm of the left hand, "INDEXFINGER" for the index finger "EXTENDED" modifying "INDEXFINGER", "MIDDLEFINGER" for the middle finger, "EXTENDED" modifying "MIDDLEFINGER", "RINGFINGER" for the ring finger, "CURLED" modifying "RINGFINGER", "LITTLEFINGER" for the little finger, "CURLED" modifying "LITTLEFINGER", "THUMB" for the thumb and "CURLED" modifying "THUMB".

In some examples, entire words may also be identified by the gesture text input recognition component 410 based on hand classifiers indicated by the hand classifier probability data 430. In additional examples, a command, such as command corresponding to a specified set of keystrokes in an input system having a keyboard, may be identified by the gesture text input recognition component 410 based on hand classifiers indicated by the hand classifier probability data 430.

The gesture inference component 408 and the gesture text input recognition component 410 communicate the gesture input data 426 and symbol input data 414, respectively, to a system framework component 416. The system framework component 416 receives the gesture input data 426 and the symbol input data 414 (collectively and separately "input event data") and generates undirected input event data 436 or directed input event data 438 based in part on the input event data. Undirected input events belonging to an undirected class of input events are routed to operating system level components, such as a system user interface component 418. Directed input events belonging to a directed class of input events are routed to a target component such as an AR gesture application component 420.

In an example of processing input data received from the gesture inference component 408 and the gesture text input recognition component 410 that are classifiable as undirected input event data 436, the system framework component 416 classifies the input data as undirected input event data 436 based on the input data and component registration data described below. The system framework component 416, on the basis of classifying that the input data as undirected input event data 436, routes the input data as undirected input event data 436 to the system user interface component 418.

The system user interface component 418 receives the undirected input event data 436 and determines a target component based on a user's indication or selection of a virtual object associated with the target component while making a gesture corresponding to the undirected input event data 436. In an example, the system user interface component 418 determines a location in the real-world scene environment of the user's hand while making the gesture. The system user interface component 418 determines a set of virtual objects that are currently being provided by the AR system to the user in an AR experience. The system user interface component 418 determines a virtual object whose apparent location in the real-world scene environment correlates to the location in the real-world scene environment of the user's hand while making the gesture. The system user interface component 418 determines the target AR application component on the basis of looking up, in internal data structures of the AR system, an AR application component to which the virtual object is associated and determines that AR application component as the target AR application component.

The system user interface component 418 registers the target AR application component to which the directed input event data 438 is to be routed with the system framework component 416. The system framework component 416 stores component registration data, such as component registration data 450 of FIG. 4B, in a datastore do be accessed during operation of the system framework component 416. The component registration data 450 includes a component ID field 442 identifying a target AR application component, a registered language field 448 identifying a language model to be associated with the target AR application component, and one or more registered gesture fields 444 and/or registered symbols fields 446 indicating gestures and symbols that are to be routed to the registered AR application component. As illustrated, the component ID field 442 includes an AR application component identification "TEXT ENTRY"; the registered language field 448 identifies a language associated with the registered AR application component, namely "ENGLISH"; the registered gesture field 444 includes a gesture identification, namely "LEFT_PALMAR_FINGERS EXTENDED_RIGHT_PALMAR_FINGERS_EXTENDED", that should be routed to the registered target AR application component, and registered symbols field 446 identifying a set of symbols, namely "[*]" signifying all symbols, that should be routed to the registered AR application component.

As another example of component registration data, component registration data 452 of FIG. 4C includes a component ID field 454 including an AR application component identification "EMAIL"; a registered language field 458 identifying a language associated with the registered AR application component, namely "ASL", and a registered symbol field 456 identifying a set of symbols, namely the word "EMAIL", that should be routed to the registered AR application component.

In some examples, an API is provided by the AR system so that an AR application component can register itself with the system framework component 416 such as, but not limited to, at a time the AR application component is installed.

Referring again to the system framework component 416 processing input data received from the gesture inference component 408 and the gesture text input recognition component 410 that are classifiable as undirected input event data 436, the system framework component 416 classifies input data received from the gesture inference component 408 and the gesture text input recognition component 410 as either undirected input event data 436 or directed input event data 438 based on the input data and component registration data. In an example, when processing symbol input data 414, the system framework component 416 searches registered symbols fields of the component registration data, such as registered symbols field 446 of component registration data 450, for registered symbols that match the symbol input data. When the system framework component 416 determines a match, the system framework component 416 determines that the symbol input data is directed input event data 438. The system framework component 416 also determines a target AR application component based on a target AR application component identified in a component ID field, such as component ID field 442, of the component registration data including the matched registered symbols.

In a similar manner, when processing gesture input data 426, the system framework component 416 searches the registered gesture fields of the component registration data, such as registered gesture field 444 of component registration data 450, for registered gestures that match the gesture input data. When the system framework component 416 determines a match, the system framework component 416 determines that the gesture input data is directed input event data 438 and also determines a target AR application component to which the directed input event data 438 is to be routed. In a case the system framework component 416 determines that the symbol input data and/or the gesture input data of the input data are not found in the component registration data, the 416 determines that the input data are to be classified as undirected input event data 436 and are to be routed to the system user interface component 418.

In another example of processing directed input event data 438, an AR application component, such as the AR gesture application component 420, registers itself with the system framework component 416. To do so, the AR application component communicates component registration data, such as component registration data 450 of FIG. 4B, to the system framework component 416. The system framework component 416 receives the component registration data and stores the component registration data in a datastore for use in routing directed input event data 438 to the AR application component.

In another example of processing directed input event data 438, the AR system determines that the directed input event data 438 is to be routed to an AR application component based on an implication. For example, if the AR system is executing a current AR application component in a single-application modal state, the current AR application component is implied as the AR application component to which the directed input event data 438 should be routed.

In some examples, an API is provided by the AR system so that an AR application component can access the gesture input data 426 and the symbol input data 414 from the system framework component 416.

In some examples, the system framework component 416 communicates language model feedback data 424 to the hand classifier inference component 406 and the gesture inference component 408 in order to improve the accuracy of the inferences made by the hand classifier inference component 406 and gesture inference component 408. In an example, the system framework component 416 generates the language model feedback data 424 based on user context data such as component registration data of the registered AR application components and data about hand classifiers composing the registered gestures and composing gestures associated with the registered symbols. The component registration data includes information of gestures and symbols in the gesture input data 426 and symbol input data 414 routed to the AR application component as part of directed input event data 438, as well as a language of the symbols. In addition, the system framework component 416 includes information about compositions of specific gestures including hand classifiers that are associated with the gestures and symbols.

In another example of processing language model feedback data 424, the system framework component 416 communicates hints as part of the language model feedback data 424 to the hand classifier inference component 406, gesture inference component 408, and gesture text input recognition component 410. The system framework component 416 generates the hints based on a language model associated with an AR application component, such as by a language specified in the registered language field 458 in component registration data 452. The system framework component 416 determines a probable next symbol N based on previous characters N-1, N-2, and the like. and the language model. In some examples, the system framework component 416 generates the hints based on a language model that is a hidden Markov model predicting what the next symbol N should be based on one or more of the previous characters N-1, N-2, and the like. In another example, the system framework component 416 uses AI methodologies to generate the next symbol N based on a language model that is generated using machine learning methodologies. The system framework component 416 generates the hints based on the next symbol N. In an example, the system framework component 416 determines a next gesture associated with the next symbol N by mapping the next symbol N to a next gesture based on a lookup table associating symbols with gestures. The system framework component 416 decomposes the next gesture to a set of one or more next hand classifiers. The system framework component 416 communicates the next gesture to the gesture inference component 408 as part of language model feedback data 424 and communicates the set of next hand classifiers to the hand classifier inference component 406 as part of language model feedback data 424.

AR application components executed by the AR system, such as AR DMVO application component 422, system user interface component 418, and AR gesture application component 420, are consumers of the data generated by the hand-tracking input pipeline 440, such as coordinate transformation data 432, skeletal model data 434, gesture input data 426, and symbol input data 414. The AR system executes the AR DMVO application component 422 to provide a user interface to a user of the AR system utilizing direct manipulation of visual objects within a 2D or 3D user interface. The AR system executes the system user interface component 418 to provide a system-level user interface to the user of the AR system, such as a command console or the like, utilizing gestures as an input modality. The AR system executes the AR gesture application component 420 to provide a user interface to a user of the AR system, such as an AR experience, utilizing gestures as an input modality.

In some examples, the camera service component 402, skeletal model inference component 404, and gross hand position inference component 412 communicate using an automatically synchronized shared-memory buffer. In addition, the skeletal model inference component 404 and gross hand position inference component 412 publish the skeletal model data 434 and the coordinate transformation data 432, respectively, on a memory buffer that is accessible by components and applications outside of the hand-tracking input pipeline 440, such as the AR DMVO application component 422.

In many examples, the hand classifier inference component 406, the gesture inference component 408, and gesture text input recognition component 410 communicate the hand classifier probability data 430, the gesture input data 426, and the symbol input data 414, respectively, via inter process communication methodologies.

In some examples, the hand-tracking input pipeline 440 operates continuously generating and publishing symbol input data 414, gesture input data 426, skeletal model data 434, coordinate transformation data 432 based on the real-world scene environment frame data 428 generated by the one or more cameras of the AR system.

Figure 5A:
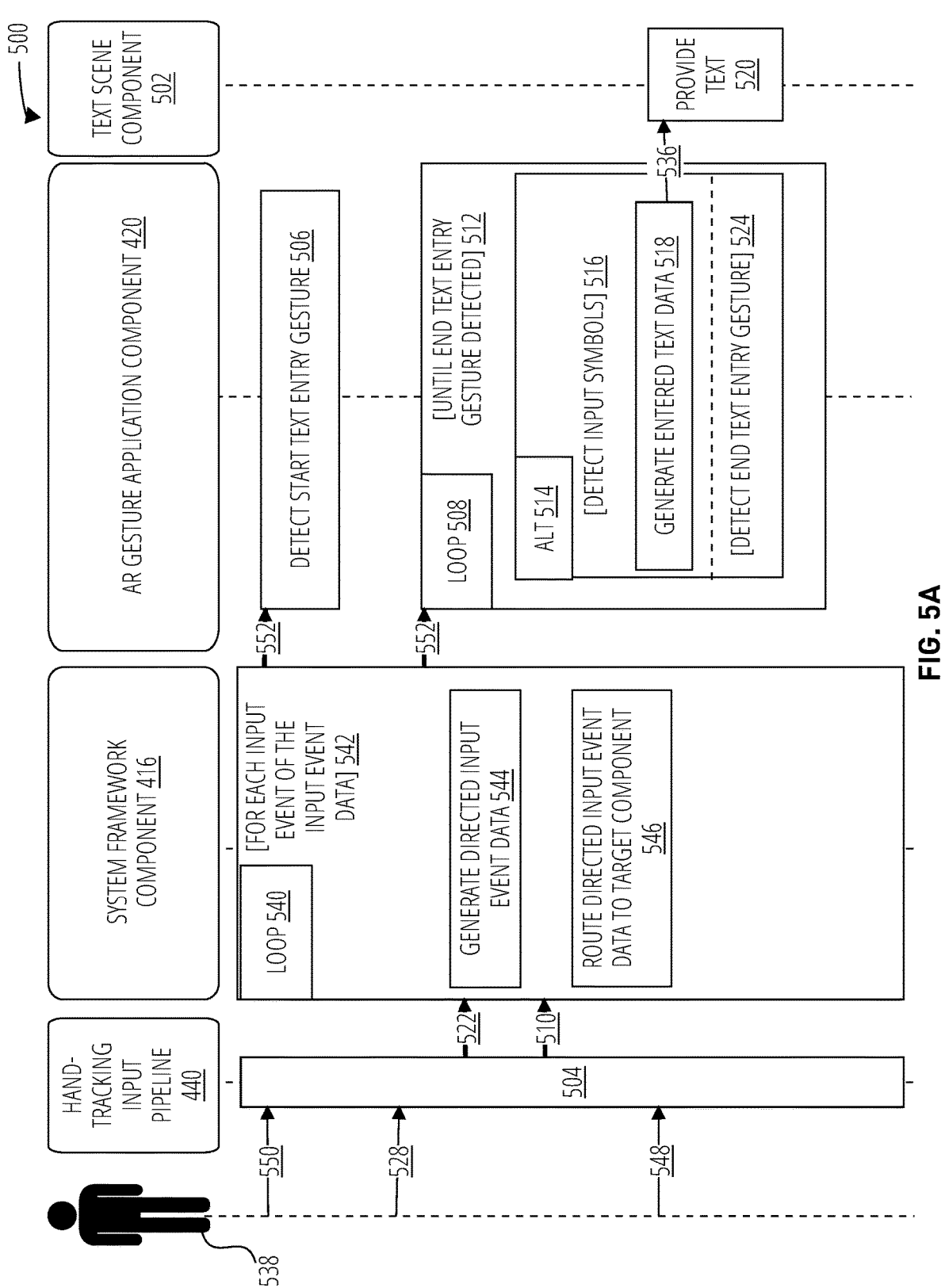
FIG. 5A is a sequence diagram of a fingerspelling text entry process of an AR system, in accordance with some examples.
Figure 5B:
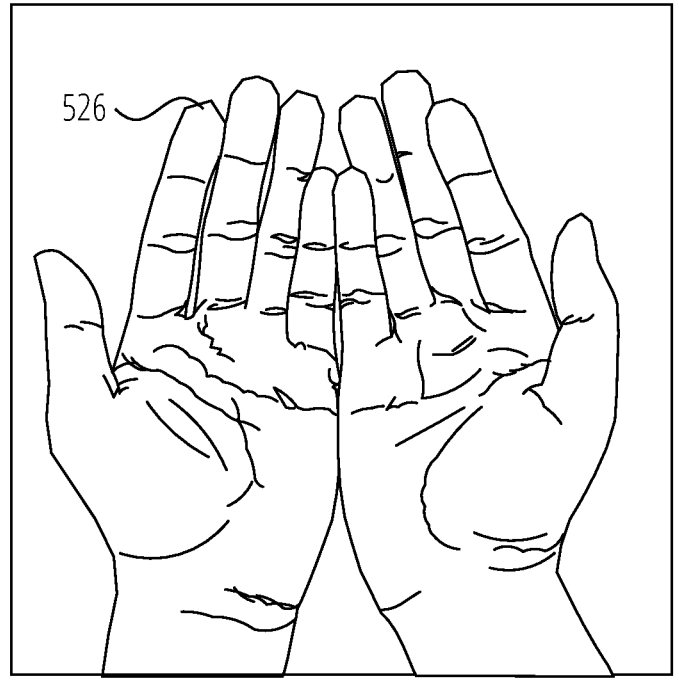
FIG. 5B is an illustration of a start/stop text entry gesture, in accordance with some examples.

FIG. 5A is a sequence diagram of a fingerspelling text entry process 500 of an AR system, such as glasses 100, FIG.

Figure 5C:
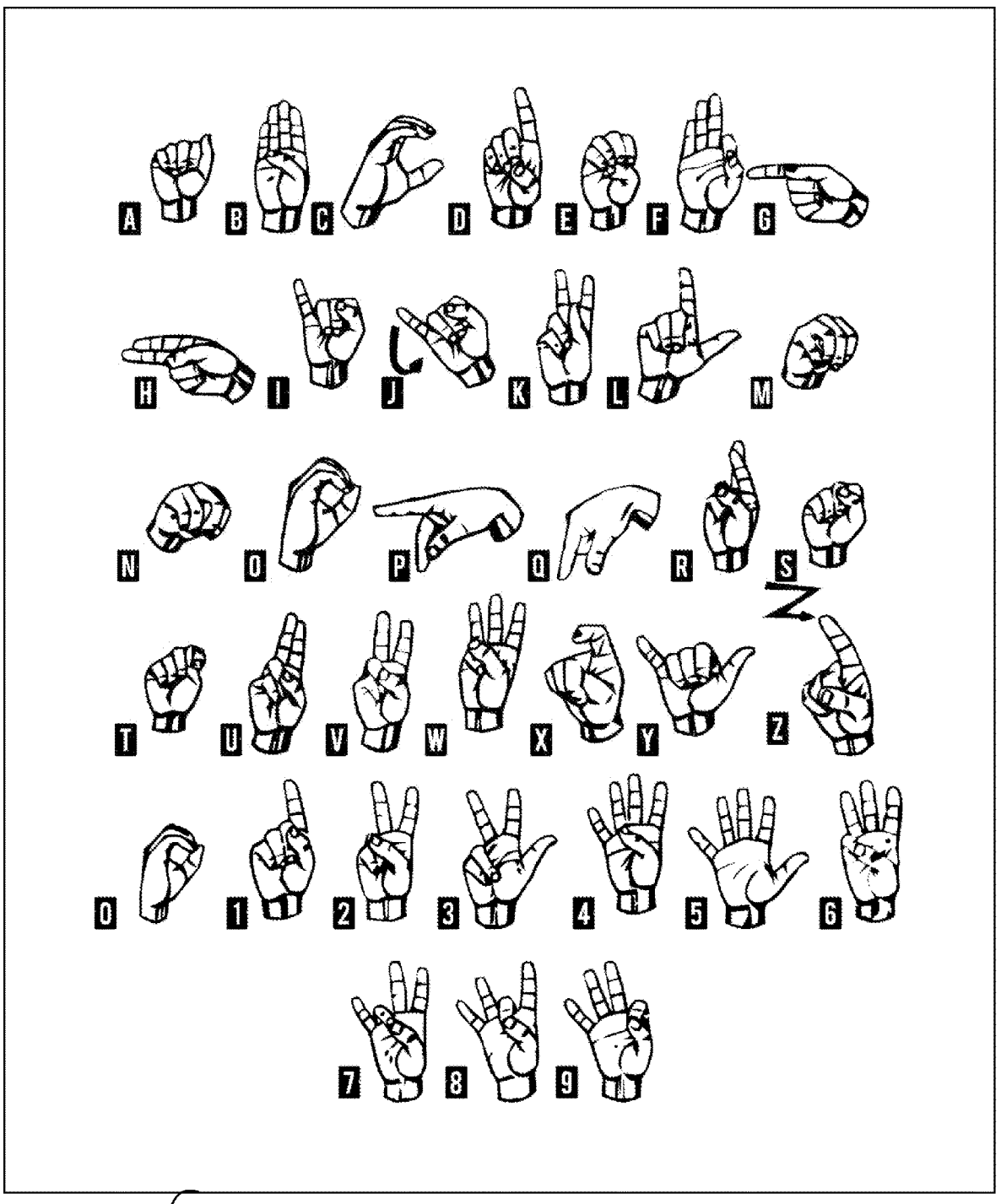
FIG. 5C is an illustration of fingerspelling signs, in accordance with some examples.
Figure 5D:
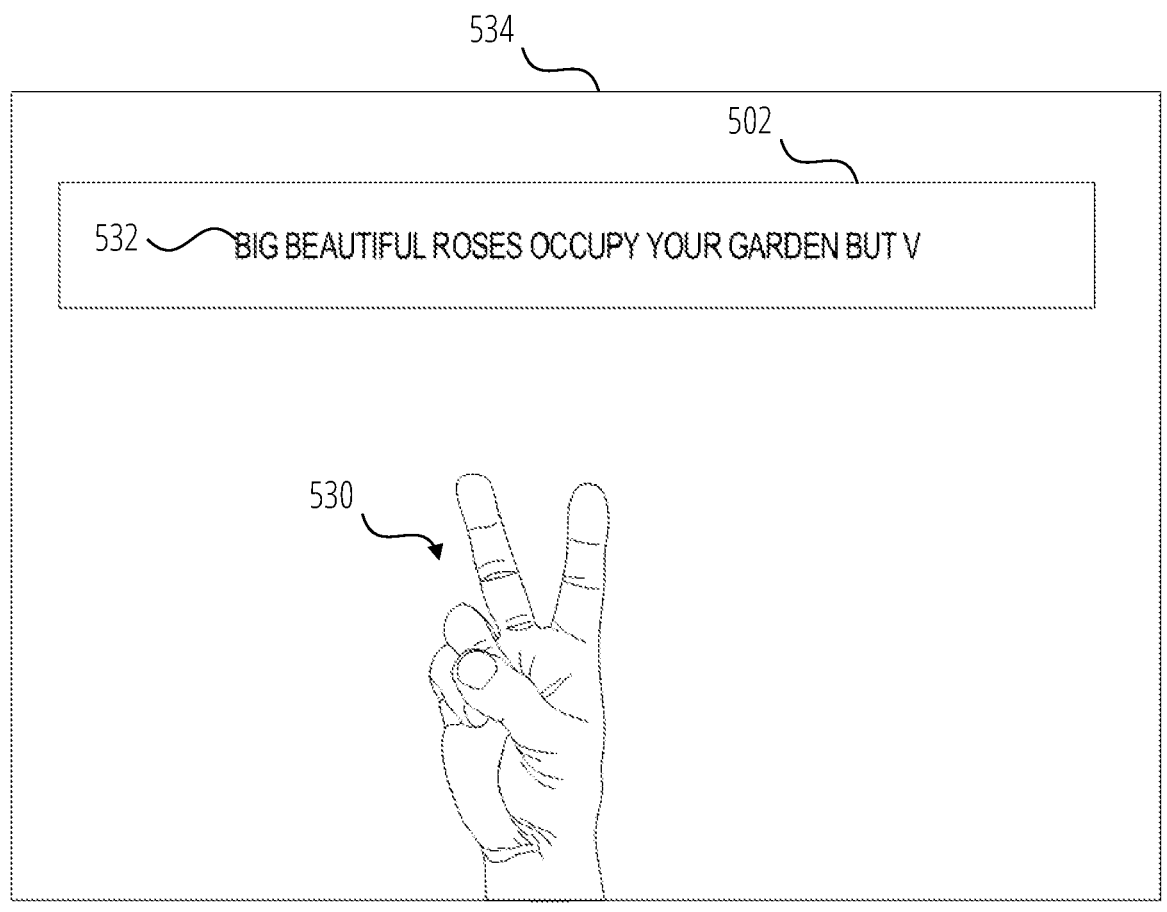
FIG. 5D is an illustration of an AR overlay, in accordance with some examples.

5B is an illustration of a start/end text entry gesture 526, FIG. 5C is an illustration of fingerspelling signs 528, and FIG. 5D is an illustration of an AR overlay 534 in accordance with some examples. During the fingerspelling text entry process 500, the AR system utilizes an AR gesture application component 420 to implement the fingerspelling text entry process 500 using gesture recognition methodologies.

The AR system utilizes a hand-tracking input pipeline 440 to supply AR gesture application component 420 with symbol input event data 510 and gesture input event data 522 as part of directed input event data 552. A gesture text input recognition component 410 generates the symbol input event data 510 based on a fingerspelling model and hand classifier probability data 430. In some examples, the gesture text input recognition component 410 classifies the hand classifier probability data 430 and assigns the hand classifier probability data 430 to fingerspelling signs, such as the fingerspelling signs 528 of FIG. 5C, that correspond to letters or characters in an alphabet and numerals, using AI methodologies and a fingerspelling model generated using machine learning methodologies. The gesture text input recognition component 410 generates the symbol input event data 510 based on the fingerspelling signs by mapping the fingerspelling signs to respective characters in the alphabet or numerals.

In additional examples, the gesture text input recognition component 410 compares the hand classifier probability data 430 to a previously determined set of fingerspelling models where a member fingerspelling model of the set of fingerspelling models corresponds to an individual fingerspelling sign. The gesture text input recognition component 410 selects a fingerspelling sign corresponding to the hand classifier probability data 430 based on the comparison and generates the symbol input event data 510 based on the fingerspelling signs by mapping the fingerspelling signs to respective characters in the alphabet or numerals.

In some examples, additional gestures and signs (not shown) are made by the user 538 to indicate text editing commands. The user 538 uses these to commands instruct the AR system to perform editing functions on entered text.

During use of the AR system by user 538, when the user 538 wants to enter text into a virtual object, such as text scene component 502, of an AR gesture application component, such as AR gesture application component 420, the user 538 creates an input event by making start text entry gesture 550, such as start/end text entry gesture 526. In operation 504, the hand-tracking input pipeline 440 generates gesture input event data 522 based on real-world scene environment video frame data of the start text entry gesture 550 being made by the user 538 as described herein. The hand-tracking input pipeline 440 communicates the gesture input event data 522 to a system framework component 416.

In loop operation 540, the system framework component 416 receives and processes each input event included in the gesture input event data 522 and the symbol input event data 510 received from the hand-tracking input pipeline 440 as indicated by guard condition 542. In operation 544, the system framework component 416 generates directed input event data 552 based on the gesture input event data 522 and component registration data as described herein. In operation 546, the system framework component 416 routes the directed input event data 552 to the AR gesture application component 420.

In operation 506, the AR gesture application component 420 receives the directed input event data 552 including the gesture input event data 522 of the start text entry gesture

550 being made by the user 538 and detects that the start text entry gesture 550 is being made by the user 538 based on the directed input event data 552 and initiates text entry into the text scene component 502.

The user 538 makes one or more fingerspelling signs 528 and in operation 504, the hand-tracking input pipeline 440 generates symbol input event data 510 of the fingerspelling signs 528 based on real-world scene environment video frame data generated by the one or more cameras as described herein. The hand-tracking input pipeline 440 communicates the symbol input event data 510 to the system framework component 416.

In operation 544 of loop operations 540, the system framework component 416 generates directed input event data 552 based on the symbol input event data 510 and component registration data as described herein. In operation 546, the system framework component 416 routes the directed input event data 552 including the symbol input event data 510 to the AR gesture application component 420.

In loop operation 508, the AR gesture application component 420 executes loop operation 508 until the AR gesture application component 420 detects an end text entry gesture 548 being made by the user, such as start/end text entry gesture 526, as indicated by guard condition 512.

In alternative operation 514 the AR gesture application component 420 receives the directed input event data 552 and detects one or more input symbols of the symbol input event data 510 in the directed input event data 552, as indicated by guard condition 516. The one more input symbols correspond to the one or more fingerspelling signs 528, such as "V" fingerspelling sign 530, being made by the user 538. The one or more input symbols include characters corresponding to letters in an alphabet, numerals and editing commands. On the basis of detecting the input symbols, in operation 518, the AR gesture application component 420 generates entered text data 536 based on the one more input symbols and communicates the entered text data 536 to the text scene component 502. In operation 520, the text scene component 502 provides entered text 532 to the user in the text scene component 502 based on the entered text data 536.

In some examples, the one or more input symbols correspond to one or more editing commands for text being entered by the user 538. On the basis of determining that the one or more input symbols correspond to one or more editing commands, the AR gesture application component 420 performs one or more editing functions on the entered text 532, such as a cut operation, copy operation, paste operation, and the like.

When the user 538 is finished entering text into the text scene component 502, the user 538 makes an end text entry gesture 548, such as start/end text entry gesture 526. In operation 504, the hand-tracking input pipeline 440 generates gesture input event data 522 based on real-world scene environment video frame data of the end text entry gesture 548 being made by the user 538 as described herein. The hand-tracking input pipeline 440 communicates the gesture input event data 522 to the system framework component 416.

In operation 544, the system framework component 416 generates directed input event data 552 including the gesture input event data 522 based on the gesture input event data 522 and the component registration data as described herein. In operation 546, the system framework component 416 routes the directed input event data 552 to the AR gesture application component 420.

In loop operation 508, the AR gesture application component 420 receives the directed input event data 552. In alternative operation 514, the AR system detects the end text entry gesture 548 being made by the user 538 based on the gesture input event data 522 of the directed input event data 552, as indicated by guard condition 524. On the basis of detecting the end text entry gesture 548, the AR gesture application component 420 terminates thus terminating the fingerspelling text entry process 500.

In some examples, the AR gesture application component 420 of the AR system performs the functions of the hand-tracking input pipeline 440 and the system framework component 416 by utilizing various APIs and system libraries of the AR system.

Figure 6A:
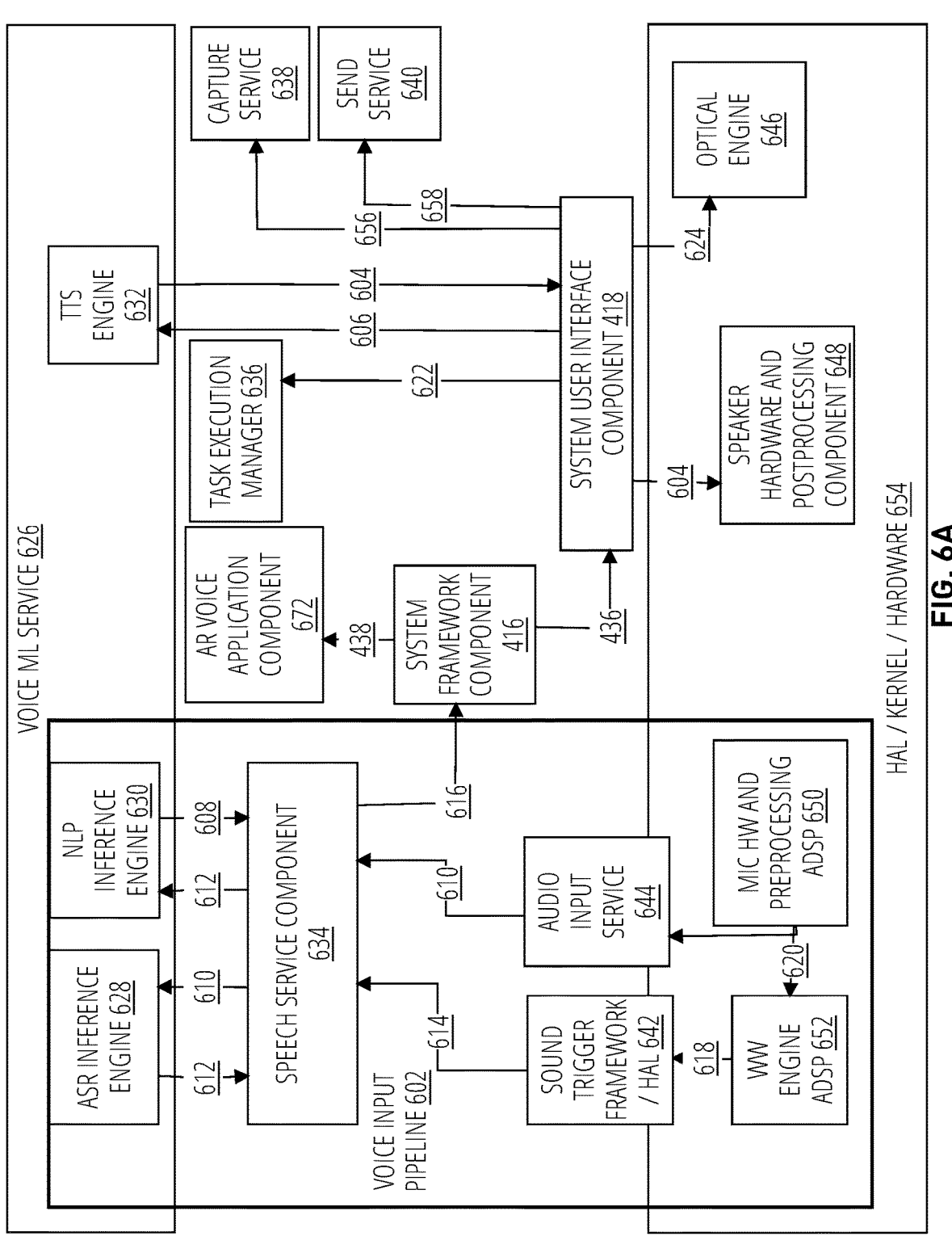
FIG. 6A is a deployment diagram of a voice user interface pipeline, in accordance with some examples.

FIG. 6A is a deployment diagram of a voice input pipeline in accordance with some examples. An AR system, such as glasses 100, uses a voice input pipeline 602 to receive and process voice commands from user. The voice input pipeline 602 processes audio signals captured by a microphone hardware and preprocessing audio Digital Signal Processor (aDSP) component 650 that is a component of a set of Hardware Abstraction Layer (HAL), kernel, and hardware components 654 of the AR system. The microphone hardware and preprocessing aDSP component 650 uses one or more audio input devices, such as microphone 134 and microphone 136 of glasses 100 (of FIG. 1) to capture speech input data from a user of the AR system. The voice input pipeline 602 uses the services of one or more voice Machine Learning (ML) services 626 to process audio signal data 620 captured by the microphone hardware and preprocessing aDSP component 650.

The HAL, kernel, and hardware components 654 comprise a Wake Word (WW) WW engine audio Digital Signal Processor (aDSP) 652 that is operable to generate an interrupt 618 using the audio signal data 620. The WW engine aDSP 652 provides wake word detection capabilities for the AR system. During operation, the WW engine aDSP 652 continuously receives the audio signal data 620 and detects specific sound patterns or keywords in the audio signal data 620, and generates the interrupt 618 in response. In some examples, the WW engine aDSP 652 is implemented in an audio digital signal processing component. In some examples, the WW engine aDSP 652 uses AI methodologies to detect a wake word in the audio signal data 620. In some examples, the WW engine aDSP 652 processes haptic inputs such as, but not limited to, a button press, a touchscreen touch, a key press, or the like.

The WW engine aDSP 652 communicates the interrupt 618 to a sound trigger framework/HAL component 642. The sound trigger framework/HAL component 642 acts as an interface between the components of the HAL, kernel, and hardware components 654 and a speech service component 634. The sound trigger framework/HAL component 642 receives the interrupt 618 and generates a wake command 614 that the sound trigger framework/HAL component 642 communicates to the speech service component 634.

In response to receiving the wake command 614, the speech service component 634 begins to monitor microphone data 610 generated by an audio input service 644. The audio input service 644 receives the audio signal data 620 from the microphone hardware and preprocessing aDSP component 650 and routes the audio signal data 620 as the microphone data 610 to the speech service component 634. In some examples, the microphone hardware and preprocessing aDSP component 650 includes processing capabilities to implement algorithms that improve the quality of the audio signal data 620 for speech recognition, voice activity detection, and similar processing.

The speech service component 634 is operably coupled to one or more speech analysis components of a voice ML service 626. In some examples, the voice ML service 626 is a service that is provided by the AR system. In some examples, the voice ML service 626 is a service provided by a device or system external to the AR system. In some examples, the voice ML service 626 is a cloud-based service that is accessible by the AR system via a network. In some examples, the voice ML service 626 comprises an Automatic Speech Recognition (ASR) inference engine 628, a Natural Language Processing (NLP) inference engine 630, a Text-To-Speech (TTS) engine 632, and the like.

In some examples, the ASR inference engine 628 uses a combination of statistical models and machine learning algorithms to recognize speech patterns and convert them into the transcription data 612 using the microphone data 610.

In some examples, the NLP inference engine 630 processes and analyzes the transcription data 612 to generate intent data 608 of a user of the AR system. In some examples, NLP inference engine 630 uses a combination of linguistic rules, statistical models, and machine learning algorithms to perform its operations. In some examples, the intent data 608 comprises named entity identification, a sentiment analysis, a topic model, a language translation, and the like.

In some examples, the TTS engine 632 receives text data as input and analyzes the text to identify the appropriate pronunciation, tone, and intonation for each word or phrase in the text. In some examples, the TTS engine 632 uses a pre-recorded speech database that contains individual segments of recorded speech for each phoneme, word, or phrase in a target language, to generate text-to-speech data 604 that encodes the text data 606 as audio data. The segments are combined in real-time to create a natural-sounding voice that speaks the written text.

In some examples, the TTS engine 632 uses machine learning algorithms to generate speech on-the-fly by analyzing the acoustic properties of spoken language and using neural networks to generate speech sounds that mimic the sound patterns of natural language.

During operation, the speech service component 634 communicates the microphone data 610 to the ASR inference engine 628. The ASR inference engine 628 receives the microphone data 610 and generates transcription data 612 using the microphone data 610. The ASR inference engine 628 communicates the transcription data 612 to the speech service component 634. The speech service component 634 receives the transcription data 612 and communicates the transcription data 612 to the NLP inference engine 630. The speech service component 634 receives the intent data 608 and generates semantic event data in the form of a combination of the intent data 608 and the transcription data 612 and communicates the intent data 608 and the transcription data 612 as intent and transcription data 616 to the system framework component 416.

In some examples, NLP inference engine 630 receives the transcription data 612 directly from the ASR inference engine 628 and generates the intent data 608 without the need for the transcription data 612 to be round-tripped by the speech service component 634. Accordingly, the components of the voice ML service 626 generate the intent data 608 using the microphone data 610 directly.

In some examples, an API is provided by the AR system so that an AR application component can access the intent data 608 and the transcription data 612 from the system framework component 416.

The system framework component 416 receives the intent and transcription data 616 and uses it to generate directed input event data 438 or undirected input event data 436. Undirected input event data belonging to an undirected class of input events are routed to operating system level components, such as a system user interface component 418. Directed input event data belonging to a directed class of input events are routed to a target component such as an AR gesture application component 420. The system framework component 416 classifies the intent and transcription data 616 using the intent and transcription data 616 and component registration data as described below.

Figure 6B:
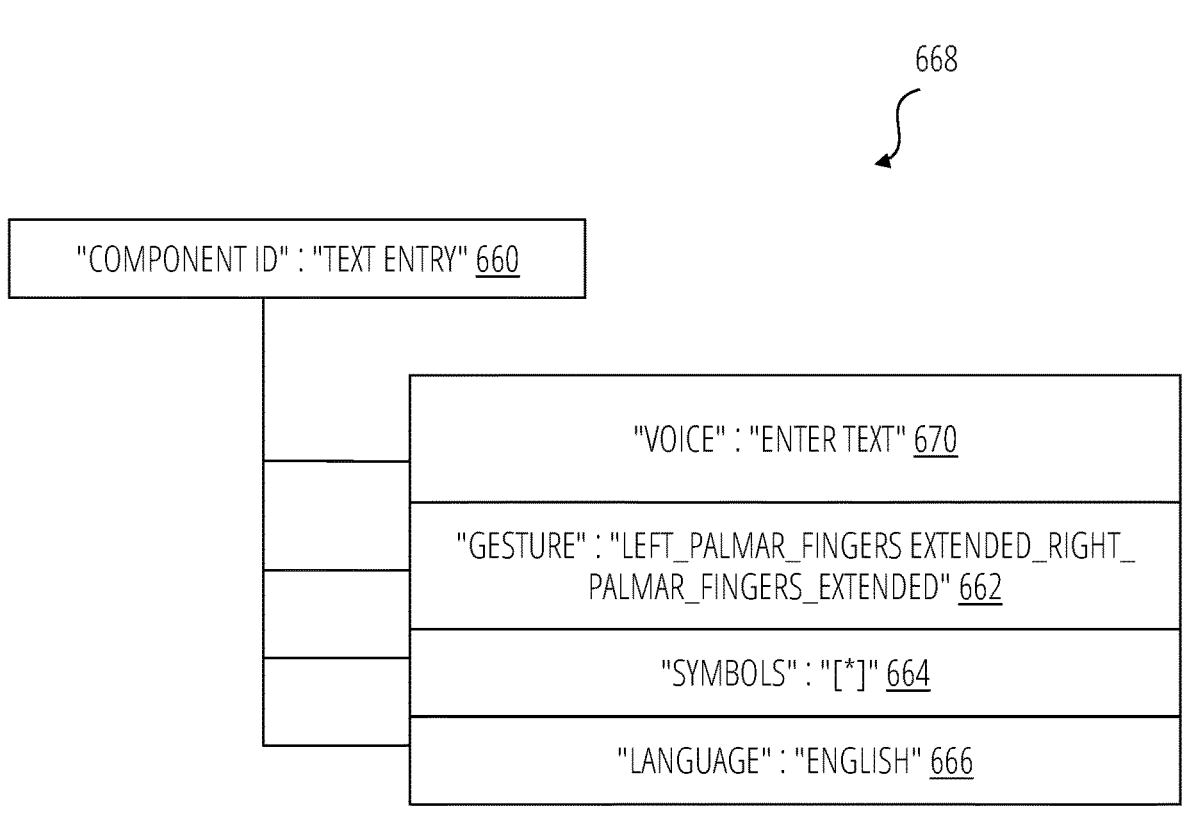
FIG. 6B is an illustration of a data structure, in accordance with some examples.

The system framework component 416 stores component registration data, such as component registration data 668 (of FIG. 6B), in a datastore do be accessed during operation of the system framework component 416. The component registration data 668 comprises a registered language field 666 identifying a language model to be associated with the target AR application component and a component ID field 660 identifying a target AR application component to which input event data is to be routed. The component registration data 668 further comprises one or more registered voice command fields 670 identifying recognized voice commands to be associated with the target AR application component, one or more registered gesture field 662 and/or registered symbols fields 664 indicating voice commands, gestures, and symbols that are to be routed to the registered AR application component.

As illustrated, the component ID field 660 includes an AR application component identification "TEXT ENTRY"; the registered language field 666 identifies a language associated with the registered AR application component, namely "ENGLISH"; the registered gesture field 662 includes a gesture identification, namely "LEFT_PALMAR_FINGERS EXTENDED_RIGHT_PALMAR_FINGERS_EXTENDED", that should be routed to the registered target AR application component, registered symbols field 664 identifying a set of symbols, namely "[*]" signifying all symbols, that should be routed to the registered AR application component, and a registered voice command, namely "ENTER TEXT", that should be routed to the registered AR application.

In some examples, a system user interface component may register as the target AR application component.

In some examples, an API is provided by the AR system so that an AR application component can register itself with the system framework component 416 such as, but not limited to, at a time the AR application component is installed.

Referring again to the system framework component 416 processing intent and transcription data 616 received from the speech service component 634 when processing intent and transcription data 616, the system framework component 416 searches registered voice command fields of the component registration data for registered voice command that match the intent and transcription data 616. When the system framework component 416 determines a match, the system framework component 416 determines that the intent and transcription data 616 is directed input event data 438. The system framework component 416 also determines a target AR application component based on a target AR application component identified in a component ID field, such as component ID field 660, of the component registration data including the matched registered voice command. In a case the system framework component 416 determines that the intent and transcription data 616 do not match any registered voice command in the component registration data, the system framework component 416 determines that the intent and transcription data 616 are to be classified as undirected input event data 436 and are to be routed to the system user interface component 418.

In another example of processing directed input event data 438, the AR system determines that the directed input event data 438 are to be routed to an AR application component based on an implication. For example, if the AR system is executing a current AR application component in a single-application modal state, the current AR application component is implied as the AR application component to which the directed input event data 438 should be routed.

In response to determining that the intent and transcription data 616 comprises undirected input event data 436, the system framework component 416 communicates the undirected input event data 436 to a system user interface component 418. The system user interface component 418 receives the undirected input event data 436 and determines one or more actions that are to be executed by the AR system. In some examples, the system user interface component 418 generates task refinement data 622 using the undirected input event data 436 and communicates the undirected input event data 436 to a task execution manager 636. The task execution manager 636 receives the task refinement data 622 and undertakes one or more tasks or processes using the resources of the AR system using the task refinement data 622.

In response to determining that the intent and transcription data 616 comprises directed input event data 438, the system framework component 416 communicates the directed input event data 438 to an AR voice application component 672. The AR voice application component 672 receives the directed input event data 438 and uses the directed input event data 438 to determine one or more actions that are to be executed by the AR voice application component 672.

In some examples, the system user interface component 418 generates text data 606 comprising one or more prompts or messages that the system user interface component 418 uses to prompt or message the user of the AR system.

In some examples, the system user interface component 418 communicates the text data 606 to a TTS engine 632 of the voice ML service 626. The TTS engine 632 receives the text data 606 and generates text-to-speech data 604 using the text data 606. The TTS engine 632 communicates the text-to-speech data 604 to the system user interface component 418. The system user interface component 418 receives the text-to-speech data 604 and communicates the text-to-speech data 604 to a speaker hardware and postprocessing component 648 of the HAL, kernel, and hardware components 654. The speaker hardware and postprocessing component 648 receives the text-to-speech data 604 and generates an audible spoken prompt or message provided to the user by the AR system. In some examples, the speaker hardware and postprocessing component 648 comprises processing capabilities to implement algorithms that operation on playback signals to improve playback quality, loudness, and the like.

In some examples, the system user interface component 418 receives the undirected input event data 436 and uses it to generate display data 624 of a user interface of the AR system. The system user interface component 418 communicates the display data 624 to an optical engine 646 of the HAL, kernel, and hardware components 654. The optical engine 646 receives the display data 624 and generates a display of the display data 624 in a user interface of the AR system.

In some examples, the undirected input event data 436 comprises an instruction to capture image data, video data and/or audio data by the AR system. In response to receiving an instruction to capture image data, video data and/or audio data, the system user interface component 418 communicates a capture request 656 to a capture service 638. In response, the capture service 638 uses components of the AR system, such as one or more cameras and/or one or more microphones of the glasses 100, to capture the image data, video data and/or audio data. In some examples, the undirected input event data 436 may comprise an instruction to the AR system to send captured image data, video data, text data, and/or audio data outside of the AR system such as, but not limited to, a message to a user of an interactive platform, a posting to the interactive platform, and the like. To do so, the system user interface component 418 sends a send request 658 to a send service 640. The send service 640 uses the resources of the AR system to communicate the captured image data, video data, text data, and/or audio data to the system outside of the AR system.

In some examples, the AR voice application component of the AR system performs the functions of the voice input pipeline 602 and the system framework component 416 by utilizing various APIs and system libraries of the AR system.

In some examples, an AR application component registers with the system framework component 416 to receive semantic event data from a voice input pipeline 602 (of FIG. 6A) and a hand-tracking input pipeline 440 (of FIG. 4A). During operation, the AR application component uses the semantic event data from the voice input pipeline 602 and the hand-tracking input pipeline 440 to provide an AR experience to a user.

Figure 7:
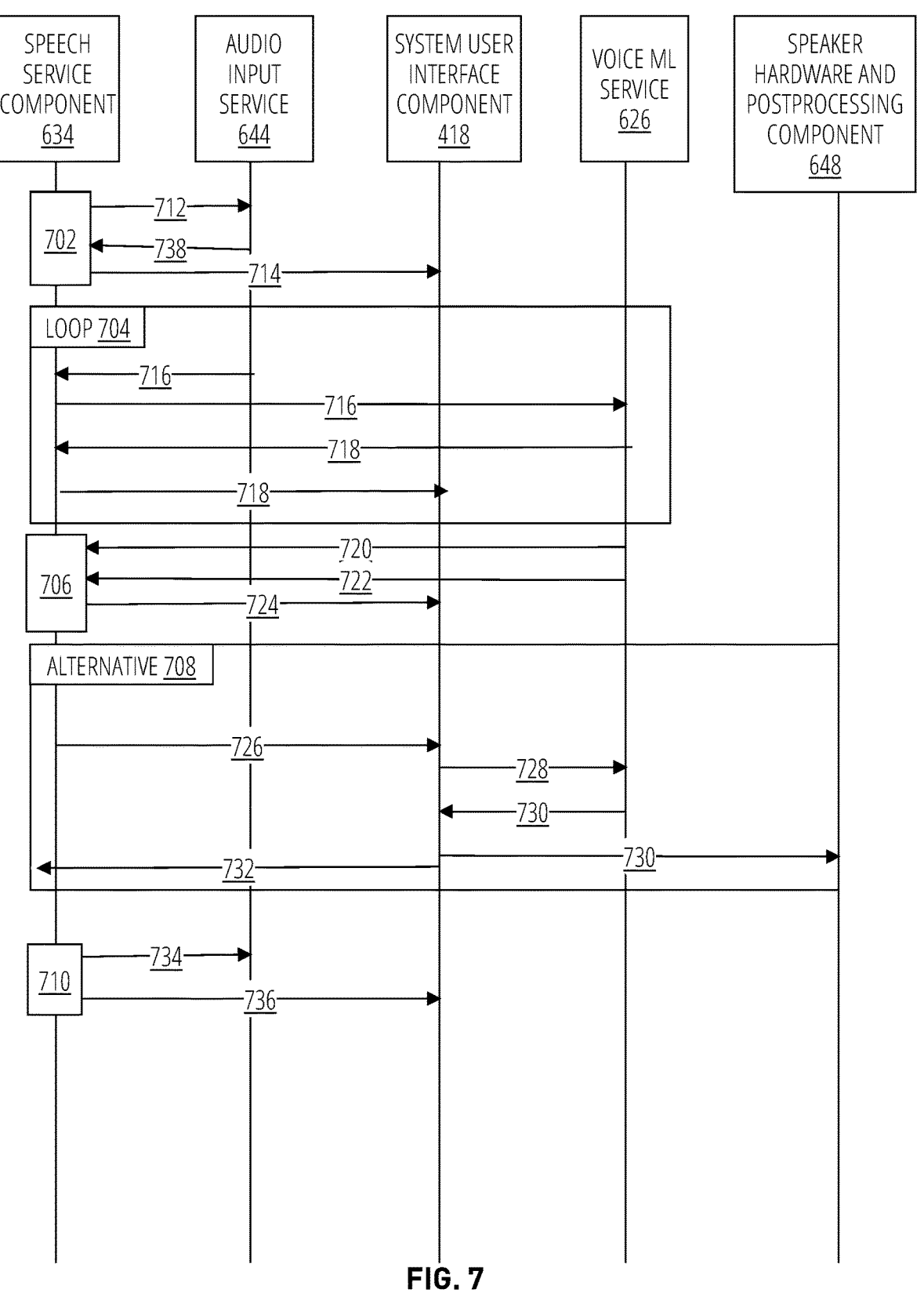
FIG. 7 is a sequence diagram of a voice user interface pipeline process, in accordance with some examples.

FIG. 7 is a sequence diagram of a voice input process in accordance with some examples. FIG. 7 illustrates how the components in FIG. 6A interact with each other when an AR system, such as glasses 100 (of FIG. 1), is listening for verbal commands issued by a user of the AR system.

In operation 702, a speech service component 634 of a voice input pipeline 602 (of FIG. 6A) communicates a microphone data request 712 to an audio input service 644 of the voice input pipeline 602. In response, the audio input service 644 communicates audio signal data 620 to the speech service component 634. The audio signal data 620 is captured by a microphone hardware and preprocessing aDSP component 650 (of FIG. 6A) using one or more microphones of the AR system and communicates the audio signal data 620 to the speech service component 634. The speech service component receives the audio signal data 620 and generates a microphone active message 714 to a system user interface component 418 via a system framework component 416 as described in reference to FIG. 6A. In response to receiving the microphone active message 714, the system user interface component 418 generates an "microphone active" display that is displayed to the user of the AR system.

In loop operation 704, the audio input service 644 communicates audio data 716 to the speech service component 634. The speech service component 634 receives the audio data 716 and forwards the audio data 716 to a voice ML service 626. The voice ML service 626 receives the audio data 716 and generates a text transcription 718 using the audio data 716 as described in reference to FIG. 6A. The voice ML service 626 communicates the text transcription 718 to the speech service component 634.

In some examples, the speech service component 634 receives the speech service component 634 and communicates the text transcription 718 to the system user interface component 418 via the system framework component 416 as described in reference to FIG. 6A. The system user interface component 418 receives the text transcription 718 and displays the text transcription 718 to the user of the AR system as described in reference to FIG. 6A.

The AR system continues in loop operation 704 until the AR system detects that the user has completed or ended a command such as, but not limited to, by detecting a pause in the speech of the user, by receiving a haptic input from the user, detecting a specific gesture of the user, or the like. In response to detecting a completion or end of the command, in operation 706, the speech service component 634 receives a final transcription data 720 and an intent data 722 from the voice ML service 626. The operation 706 communicates the transcription data and intent data 724 to the system user interface component 418 as input event data via the system framework component 416 as more fully described in reference to FIG. 4A and FIG. 6A.

In response to detecting that there is no detectable speech in the audio signal data 738 or that the final transcription data 720 and intent data 722 do not contain enough information to specify a legible command, the AR system executes an alternative loop operation 708.

In alternative loop operation 708, the speech service component 634 communicates a no speech detected 726 message to the system user interface component 418 via the system framework component 416 as described more fully in reference to FIG. 6A. In response to receiving the no speech detected 726, the system user interface component 418 generates text data 728 for a prompt or message that will be provided to the user of the AR system. The system user interface component 418 communicates the text data 728 to the voice ML service 626. A TTS engine 632 (of FIG. 6A) of the voice ML service 626 generates speech data 730 using the text data 728. The voice ML service 626 communicates the speech data 730 to the system user interface component 418. The system user interface component 418 communicates the speech data 730 to a speaker hardware and post-processing component 648. The speaker hardware and post-processing component 648 receives the speech data 730 and generates an audible prompt or message to the user using the speech data 730. The system user interface component 418 sends a speech request 732 message to the speech service component 634 to request the speech service component 634 to resume operations at operation 702.

To end an interaction, in operation 710, the speech service component 634, communicates a stop request 734 to the audio input service 644 and a microphone off message 736 to the system user interface component 418. In response to receiving the microphone off message 736, the system user interface component 418, the system user interface component 418 displays a message to the user of the AR system that the microphone is now off.

Figure 8:
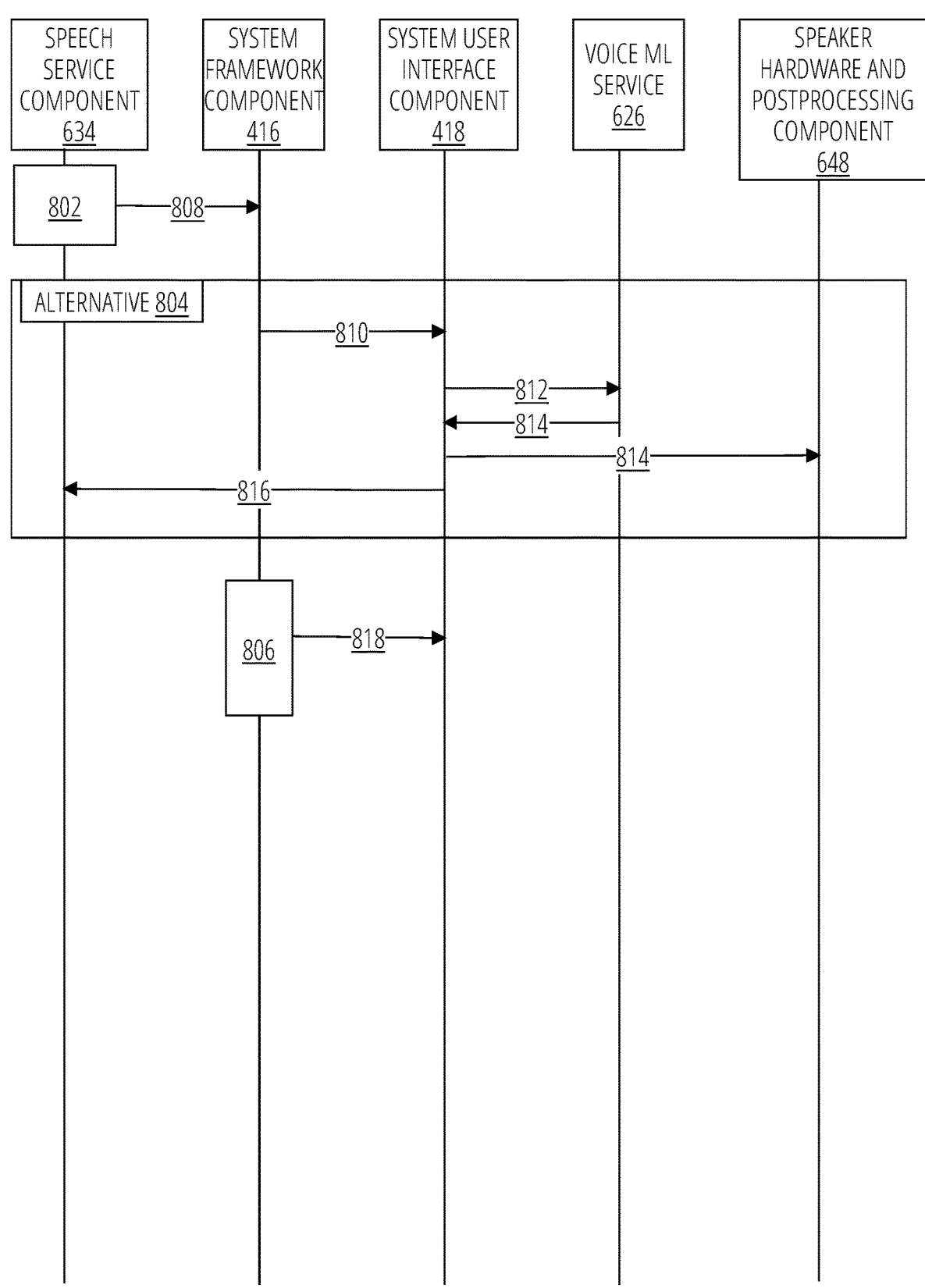
FIG. 8 is a sequence diagram of a voice input processing method, in accordance with some examples.

FIG. 8 is a sequence diagram of a voice input processing method, in accordance with some examples. An AR system, such as glasses 100 (of FIG. 1) uses the voice input processing method to process voice input into the AR system by a user.

In operation 802, a speech service component 634 communicates intent and transcription data 808 to a system framework component 416. The system framework component 416 attempts to match the intent and transcription data

808 to an AR voice application component or a system user interface component 418 as described in reference to FIG. 6A.

In response to determining that there is no match or that there is only a partial match, the AR system enters into alternative operation 804.

In alternative operation 804, the system framework component 416 communicates a command not recognized message 810 to a system user interface component 418. In response to receiving the command not recognized message 810, the system user interface component 418 generates a text-to-speech prompt data 812 as a prompt that will be used to prompt the user into making a new voice input. The system user interface component 418 communicates the text-to-speech prompt data 812 to a TTS engine 632 (of FIG. 6A) of a voice ML service 626. The voice ML service 626 generates text-to-speech data 814. The system user interface component 418 receives the text-to-speech data 814 and communicates the text-to-speech data 814 to a speaker hardware and postprocessing component 648 of the AR system. In response to receiving the text-to-speech data 814, the speaker hardware and postprocessing component 648 generates an audible prompt to the user using one or more audio speakers of the AR system, such as audio speaker 132 and audio speaker 130 (both of FIG. 1). The system user interface component 418 communicates an additional speech request 816 to the speech service component 634. In response, the speech service component 634 returns to operation 802.

In response to determining that there is a match between component registration data and the intent and transcription data 808, the system framework component 416 proceeds to operation 806.

In operation 806, the system user interface component 418 communicates the intent and transcription data 808 as undirected input event data 818 to the system user interface component 418. The AR voice application component 672 receives the undirected input event data 818 and performs one or more operations based on the content of the undirected input event data 818. In an example, the undirected input event data 818 comprises a command to take an image of a real-world scene being observed by the user of the AR system and communicate the image to a user of an interactive platform as a message. Included in the undirected input event data 818 is an address or ID of the user of the interactive platform. The system user interface component 418 generates a queue of tasks including an image capture task using a capture service 638 (of FIG. 6A) of the AR system to capture the image and a send service 640 (of FIG. 6A) of the AR system to send the image to the user of the interactive platform. A task execution manager 636 (of FIG. 6A) captures the image using the capture service 638 and communicates the image to the user of the interactive platform using the send service 640.

In some examples, the system framework component 416 determines that the intent and transcription data 808 matches data in the component registration data and the system framework component 416 communicates the intent and transcription data 808 as directed input event data to an AR voice application component that is associated with the matched data of the component registration data. The AR voice application component receives the intent and transcription data 808 and uses the intent and transcription data 808 to perform one or more operations.

Figure 9:
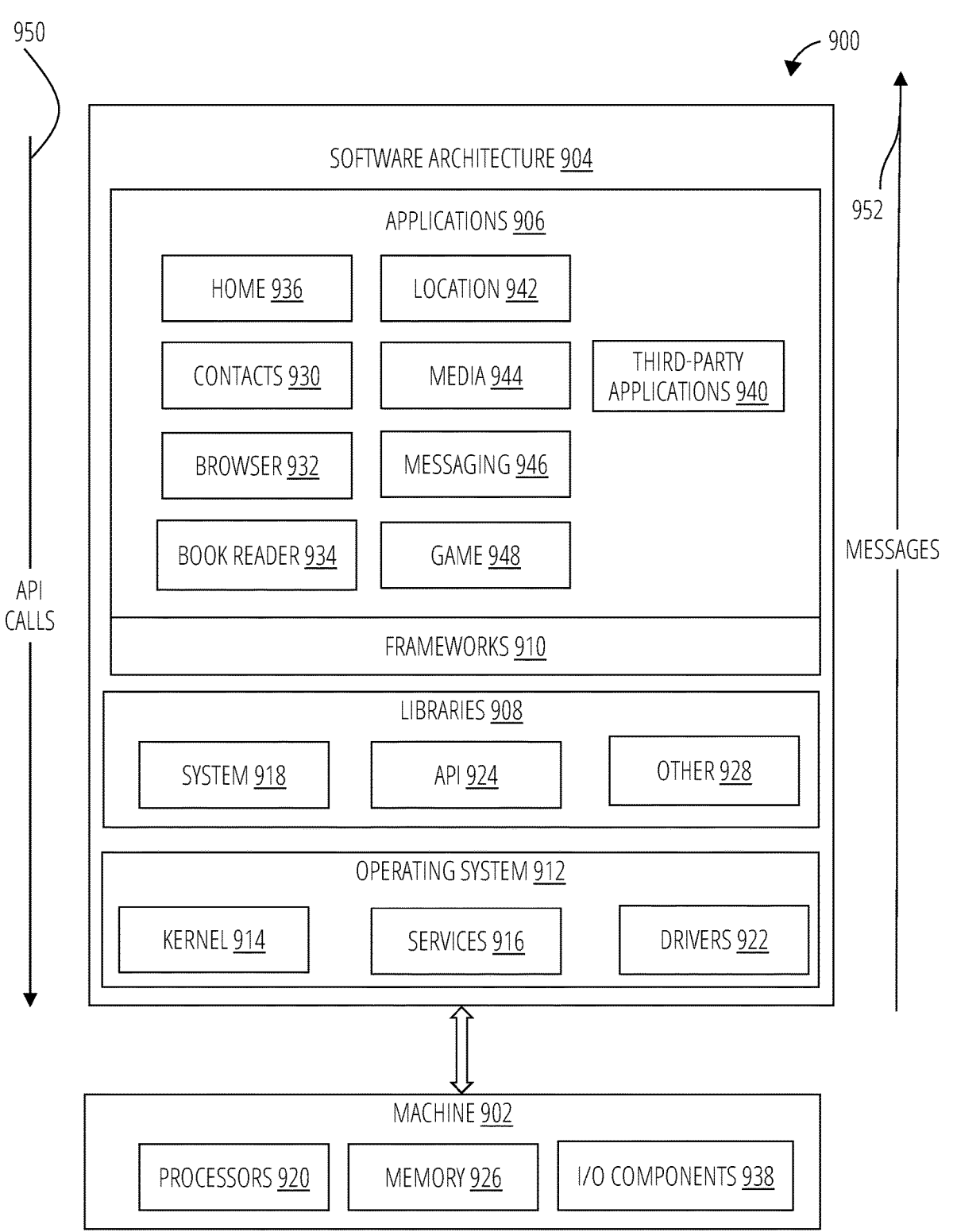
FIG. 9 is a block diagram showing a software architecture within which the present disclosure may be implemented, in accordance with some examples.

FIG. 9 is a block diagram 900 illustrating a software architecture 904, which can be installed on any one or more of the devices described herein. The software architecture

904 is supported by hardware such as a machine 902 that includes processors 920, memory 926, and I/O components 938. In this example, the software architecture 904 can be conceptualized as a stack of layers, where individual layers provide a particular functionality. The software architecture 904 includes layers such as an operating system 912, libraries 908, frameworks 910, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 908 provide a low-level common infrastructure used by the applications 906. The libraries 908 can include system libraries 918 (e.g., C standard library) that provide functions such as memory allocation functions, string manipulation functions, mathematic functions, and the like. In addition, the libraries 908 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 908 can also include a wide variety of other libraries 928 to provide many other APIs to the applications 906.

The frameworks 910 provide a high-level common infrastructure that is used by the applications 906. For example, the frameworks 910 provide various graphical user interface (GUI) functions, high-level resource management, and high-level location services. The frameworks 910 can provide a broad spectrum of other APIs that can be used by the applications 906, some of which may be specific to a particular operating system or platform.

In some examples, the applications 906 may include a home Application 936, a contacts Application 930, a browser Application 932, a book reader Application 934, a location Application 942, a media Application 944, a messaging Application 946, a game Application 948, and a broad assortment of other applications such as third-party applications 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party applications 940 (e.g., applications developed using the ANDROID™ or IOS™ software development kit (SDK) by an entity other than the vendor of the particular platform) may be mobile software running on a mobile operating system such as IOS™, ANDROID™, WIN-DOWS® Phone, or another mobile operating system. In this example, the third-party applications 940 can invoke the API calls 950 provided by the operating system 912 to facilitate functionality described herein.

Figure 10:
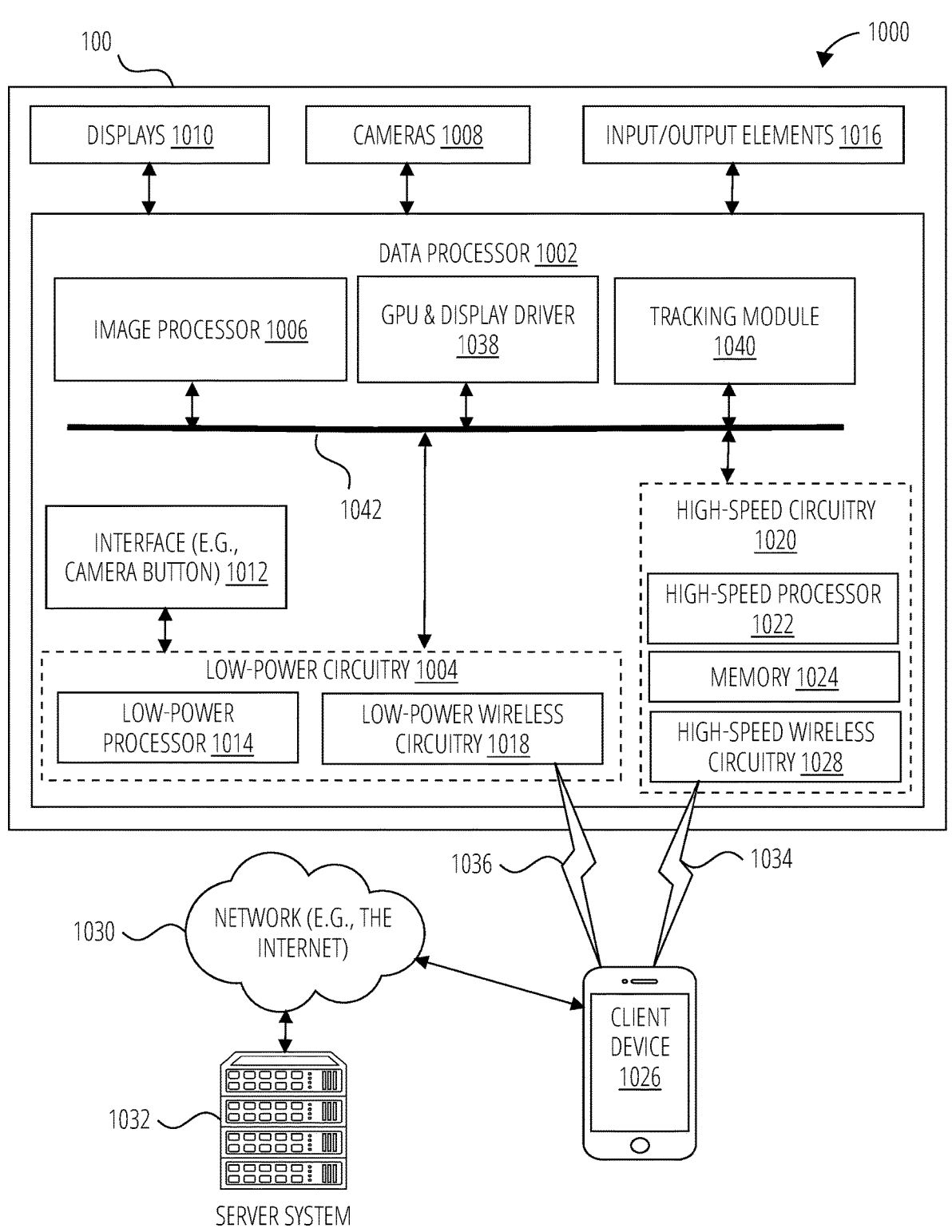
FIG. 10 is a block diagram illustrating a networked system including details of a head-worn AR system, in accordance with some examples.

FIG. 10 is a block diagram illustrating a networked system 1000 including details of the glasses 100, in accordance with some examples. The networked system 1000 includes the glasses 100, a client device 1026, and a server system 1032. The client device 1026 may be a smartphone, tablet, phablet, laptop computer, access point, or any other such device capable of connecting with the glasses 100 using a low-power wireless connection 1036 and/or a high-speed wireless connection 1034. The client device 1026 is connected to the server system 1032 via the network 1030. The network 1030 may include any combination of wired and wireless connections. The server system 1032 may be one or more computing devices as part of a service or network computing system. The client device 1026 and any elements of the server system 1032 and network 1030 may be implemented using details of the software architecture 904 or the machine 300 described in FIG. 9 and FIG. 3 respectively.

The glasses 100 include a data processor 1002, displays 1010, one or more cameras 1008, and additional input/output elements 1016. The input/output elements 1016 may include microphones, audio speakers, biometric sensors, additional sensors, or additional display elements integrated with the data processor 1002. Examples of the input/output elements 1016 are discussed further with respect to FIG. 9 and FIG. 3. For example, the input/output elements 1016 may include any of I/O components 306 including output components 328, motion components 336, and so forth. Examples of the displays 1010 are discussed in FIG. 2. In the particular examples described herein, the displays 1010 include a display for the user's left and right eyes.

The data processor 1002 includes an image processor 1006 (e.g., a video processor), a GPU & display driver 1038, a tracking module 1040, an interface 1012, low-power circuitry 1004, and high-speed circuitry 1020. The components of the data processor 1002 are interconnected by a bus 1042.

The interface 1012 refers to any source of a user command that is provided to the data processor 1002. In one or more examples, the interface 1012 is a physical button that, when depressed, sends a user input signal from the interface 1012 to a low-power processor 1014. A depression of such button followed by an immediate release may be processed by the low-power processor 1014 as a request to capture a single image, or vice versa. A depression of such a button for a first period of time may be processed by the low-power processor 1014 as a request to capture video data while the button is depressed, and to cease video capture when the button is released, with the video captured while the button was depressed stored as a single video file. Alternatively, depression of a button for an extended period of time may capture a still image. In some examples, the interface 1012 may be any mechanical switch or physical interface capable of accepting user inputs associated with a request for data from the cameras 1008. In other examples, the interface 1012 may have a software component, or may be associated with a command received wirelessly from another source, such as from the client device 1026.

The image processor 1006 includes circuitry to receive signals from the cameras 1008 and process those signals from the cameras 1008 into a format suitable for storage in the memory 1024 or for transmission to the client device 1026. In one or more examples, the image processor 1006 (e.g., video processor) comprises a microprocessor integrated circuit (IC) customized for processing sensor data from the cameras 1008, along with volatile memory used by the microprocessor in operation.

The low-power circuitry 1004 includes the low-power processor 1014 and the low-power wireless circuitry 1018. These elements of the low-power circuitry 1004 may be implemented as separate elements or may be implemented on a single IC as part of a system on a single chip. The low-power processor 1014 includes logic for managing the other elements of the glasses 100. As described above, for example, the low-power processor 1014 may accept user input signals from the interface 1012. The low-power processor 1014 may also be configured to receive input signals or instruction communications from the client device 1026 via the low-power wireless connection 1036. The low-power wireless circuitry 1018 includes circuit elements for implementing a low-power wireless communication system. Bluetooth™ Smart, also known as Bluetooth™ low energy, is one standard implementation of a low power wireless communication system that may be used to implement the low-power wireless circuitry 1018. In other examples, other low power communication systems may be used.

The high-speed circuitry 1020 includes a high-speed processor 1022, a memory 1024, and a high-speed wireless circuitry 1028. The high-speed processor 1022 may be any processor capable of managing high-speed communications and operation of any general computing system used for the data processor 1002. The high-speed processor 1022 includes processing resources used for managing high-speed data transfers on the high-speed wireless connection 1034 using the high-speed wireless circuitry 1028. In some examples, the high-speed processor 1022 executes an operating system such as a LINUX operating system or other such operating system such as the operating system 912 of FIG. 9. In addition to any other responsibilities, the high-speed processor 1022 executing a software architecture for the data processor 1002 is used to manage data transfers with the high-speed wireless circuitry 1028. In some examples, the high-speed wireless circuitry 1028 is configured to implement Institute of Electrical and Electronic Engineers (IEEE) 802.11 communication standards, also referred to herein as Wi-Fi. In other examples, other high-speed communications standards may be implemented by the high-speed wireless circuitry 1028.

The memory 1024 includes any storage device capable of storing camera data generated by the cameras 1008 and the image processor 1006. While the memory 1024 is shown as integrated with the high-speed circuitry 1020, in other examples, the memory 1024 may be an independent stand-alone element of the data processor 1002. In some such examples, electrical routing lines may provide a connection through a chip that includes the high-speed processor 1022 from image processor 1006 or the low-power processor 1014 to the memory 1024. In other examples, the high-speed processor 1022 may manage addressing of the memory 1024 such that the low-power processor 1014 will boot the high-speed processor 1022 any time that a read or write operation involving the memory 1024 is desired.

The tracking module 1040 estimates a pose of the glasses 100. For example, the tracking module 1040 uses image data and associated inertial data from the cameras 1008 and the position components 340, as well as GPS data, to track a location and determine a pose of the glasses 100 relative to a frame of reference (e.g., real-world scene environment). The tracking module 1040 continually gathers and uses updated sensor data describing movements of the glasses 100 to determine updated three-dimensional poses of the glasses 100 that indicate changes in the relative position and orientation relative to physical objects in the real-world scene environment. The tracking module 1040 permits visual placement of virtual objects relative to physical objects by the glasses 100 within the field of view of the user via the displays 1010.

The GPU & display driver 1038 may use the pose of the glasses 100 to generate frames of virtual content or other content to be presented on the displays 1010 when the glasses 100 are functioning in a traditional augmented reality mode. In this mode, the GPU & display driver 1038 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 1026, or on a remote server. For example, one or more functions or operations described herein may be performed by one of the applications 906 such as messaging Application 946.

Figure 11:
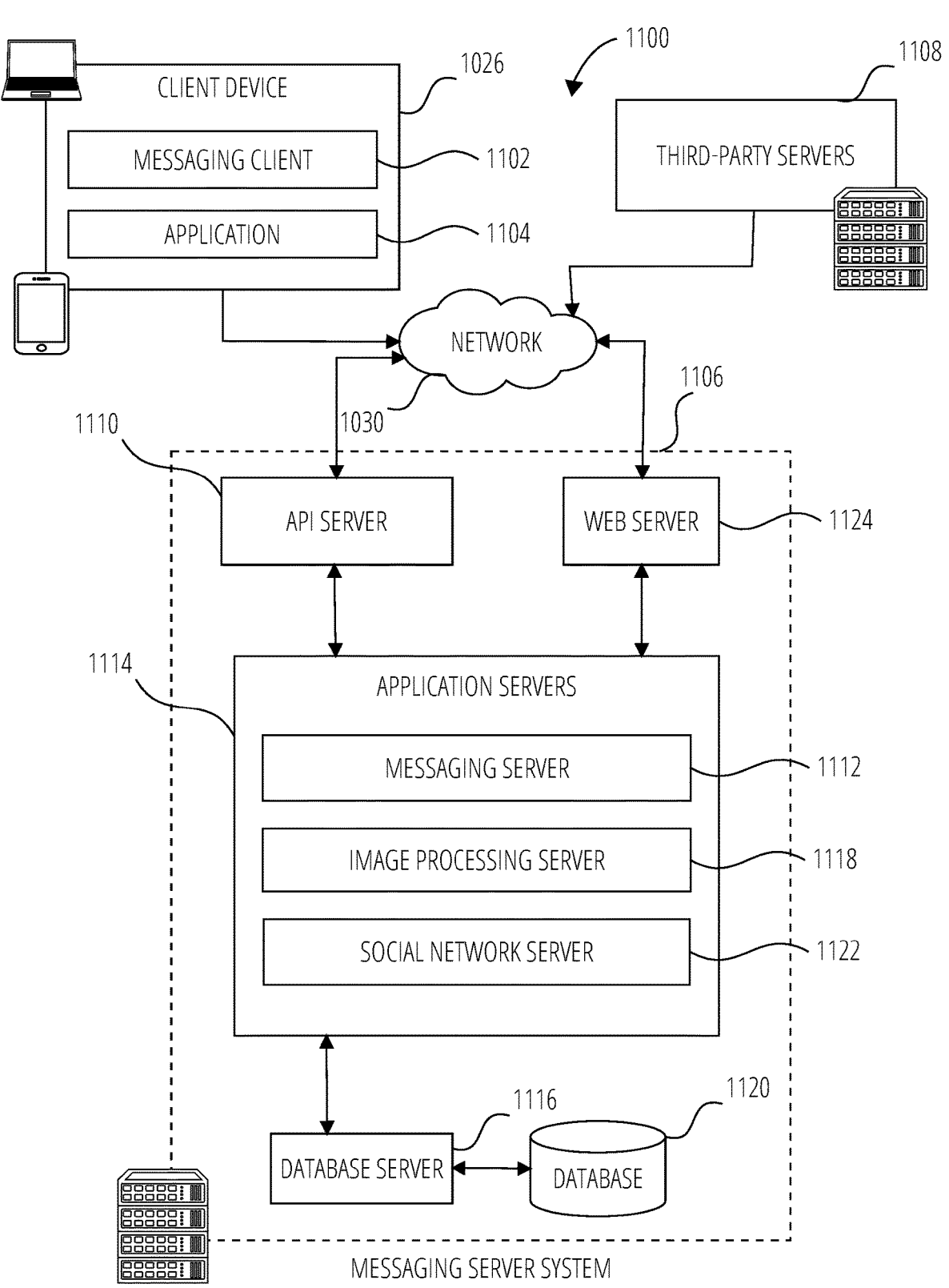
FIG. 11 is a block diagram showing an example messaging system for exchanging data (e.g., messages and associated content) over a network, in accordance with some examples

FIG. 11 is a block diagram showing an example messaging system 1100 for exchanging data (e.g., messages and associated content) over a network. The messaging system 1100 includes multiple instances of a client device 1026 which host a number of applications, including a messaging client 1102 and other Applications 1104. A messaging client 1102 is communicatively coupled to other instances of the messaging client 1102 (e.g., hosted on respective other client devices 1026), a messaging server system 1106 and third-party servers 1108 via a network 1030 (e.g., the Internet). A messaging client 1102 can also communicate with locally-hosted Applications 1104 using Application Program Interfaces (APIs).

A messaging client 1102 is able to communicate and exchange data with other messaging clients 1102 and with the messaging server system 1106 via the network 1030. The data exchanged between messaging clients 1102, and between a messaging client 1102 and the messaging server system 1106, includes functions (e.g., commands to invoke functions) as well as payload data (e.g., text, audio, video or other multimedia data).

The messaging server system 1106 provides server-side functionality via the network 1030 to a particular messaging client 1102. While some functions of the messaging system 1100 are described herein as being performed by either a messaging client 1102 or by the messaging server system 1106, the location of some functionality either within the messaging client 1102 or the messaging server system 1106 may be a design choice. For example, it may be technically preferable to initially deploy some technology and functionality within the messaging server system 1106 but to later migrate this technology and functionality to the messaging client 1102 where a client device 1026 has sufficient processing capacity.

The messaging server system 1106 supports various services and operations that are provided to the messaging client 1102. Such operations include transmitting data to, receiving data from, and processing data generated by the messaging client 1102. This data may include message content, client device information, geolocation information, media augmentation and overlays, message content persistence conditions, social network information, and live event information, as examples. Data exchanges within the messaging system 1100 are invoked and controlled through functions available via user interfaces (UIs) of the messaging client 1102.

Turning now specifically to the messaging server system 1106, an Application Program Interface (API) server 1110 is coupled to, and provides a programmatic interface to, application servers 1114. The application servers 1114 are communicatively coupled to a database server 1116, which facilitates access to a database 1120 that stores data associated with messages processed by the application servers 1114. Similarly, a web server 1124 is coupled to the application servers 1114, and provides web-based interfaces to the application servers 1114. To this end, the web server 1124 processes incoming network requests over the Hypertext Transfer Protocol (HTTP) and several other related protocols.

The Application Program Interface (API) server 1110 receives and transmits message data (e.g., commands and message payloads) between the client device 1026 and the application servers 1114. Specifically, the Application Program Interface (API) server 1110 provides a set of interfaces (e.g., routines and protocols) that can be called or queried by the messaging client 1102 in order to invoke functionality of the application servers 1114. The Application Program Interface (API) server 1110 exposes various functions supported by the application servers 1114, including account registration, login functionality, the sending of messages, via the application servers 1114, from a particular messaging client 1102 to another messaging client 1102, the sending of media files (e.g., images or video) from a messaging client 1102 to a messaging server 1112, and for possible access by another messaging client 1102, the settings of a collection of media data (e.g., story), the retrieval of a list of friends of a user of a client device 1026, the retrieval of such collections, the retrieval of messages and content, the addition and deletion of entities (e.g., friends) to an entity graph (e.g., a social graph), the location of friends within a social graph, and opening an application event (e.g., relating to the messaging client 1102).

The application servers 1114 host a number of server applications and subsystems, including for example a messaging server 1112, an image processing server 1118, and a social network server 1122. The messaging server 1112 implements a number of message processing technologies and functions, particularly related to the aggregation and other processing of content (e.g., textual and multimedia content) included in messages received from multiple instances of the messaging client 1102. As will be described in further detail, the text and media content from multiple sources may be aggregated into collections of content (e.g., called stories or galleries). These collections are then made available to the messaging client 1102. Other processor and memory intensive processing of data may also be performed server-side by the messaging server 1112, in view of the hardware requirements for such processing.

The application servers 1114 also include an image processing server 1118 that is dedicated to performing various image processing operations, typically with respect to images or video within the payload of a message sent from or received at the messaging server 1112.

The social network server 1122 supports various social networking functions and services and makes these functions and services available to the messaging server 1112. To this end, the social network server 1122 maintains and accesses an entity graph within the database 1120. Examples of functions and services supported by the social network server 1122 include the identification of other users of the messaging system 1100 with which a particular user has relationships or is "following," and also the identification of other entities and interests of a particular user.

The messaging client 1102 can notify a user of the client device 1026, or other users related to such a user (e.g., "friends"), of activity taking place in shared or shareable sessions. For example, the messaging client 1102 can provide participants in a conversation (e.g., a chat session) in the messaging client 1102 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Additional Examples Include:

Example 1 is a computer-implemented method, comprising: generating, by one or more processors, input event data using input data captured by an input device of an AR system; determining, by the one or more processors, a target AR application component of the AR system using the input event data and component registration data of one or more AR application components of the AR system; and communicating, by the one or more processors, to the target AR application component, the input data.

In Example 2, the subject matter of Example 1 includes, wherein the input event data comprises gesture input data of a gesture being made by a user of the AR system.

In Example 3, the subject matter of any one of Examples 1-2 includes, wherein the input event data comprises symbol input data of a fingerspelling sign being made by a user of the AR system.

In Example 4, the subject matter of any one of Examples 1-3 includes, wherein the input event data is generated by a hand-tracking input pipeline of the AR system.

In Example 5, the subject matter of any one of Examples 1-4 includes, wherein the input event data comprises a voice command being made by a user of the AR system.

In Example 6, the subject matter of any one of Examples 1-5 includes, wherein the input event data is generated by a voice input pipeline of the AR system.

In Example 7, the subject matter of any one of Examples 1-6 includes, wherein the voice input pipeline comprises a voice Machine Learning (ML) service.

Example 8 is at least one machine-readable medium including instructions that, when executed by processing circuitry, cause the processing circuitry to perform operations to implement of any of Examples 1-7.

Example 9 is an apparatus comprising means to implement of any of Examples 1-7.

Example 10 is a system to implement of any of Examples 1-7.

Example 11 is a method to implement of any of Examples 1-7.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being some examples of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method, comprising:

generating, by one or more processors, input event data using input data captured by an input device of an Augmented Reality (AR) system, the input event data comprising symbol input data and gesture input data, the gesture input data determined using a gesture identification comprising one or more hand classifiers;

classifying, by the one or more processors, the input event data as undirected input data or directed input data using registration data identifying one or more AR applications of the AR system, the registration data including an ID field identifying a target AR application, a registered language field identifying a language model to be associated with the target AR application, the gesture identification, and one or more symbols;

in response to classifying the input event data as undirected input data, routing, by the one or more processors, the input event data to an operating system level component of the AR system; and in response to classifying the input event data as directed input data, routing, by the one or more processors, the input event data to the target AR application.

2. The computer-implemented method of claim 1, wherein the input event data comprises gesture input data of a gesture being made by a user of the AR system.

3. The computer-implemented method of claim 1, wherein the input event data comprises symbol input data of a fingerspelling sign being made by a user of the AR system.

4. The computer-implemented method of claim 2, wherein the input event data is generated by a hand-tracking input pipeline of the AR system.

5. The computer-implemented method of claim 1, wherein the input event data comprises a voice command being made by a user of the AR system.

6. The computer-implemented method of claim 5, wherein the input event data is generated by a voice input pipeline of the AR system.

7. The computer-implemented method of claim 6, wherein the voice input pipeline comprises a voice Machine Learning (ML) service.

8. A machine comprising:

one or more processors; and non-transitory memory storing executable instructions that, when executed by the one or more processors, cause the machine to perform operations comprising:

generating input event data using input data captured by an input device of an Augmented Reality (AR) system, the input event data comprising symbol input data and gesture input data, the gesture input data determined using a gesture identification comprising one or more hand classifiers;

classifying the input event data as undirected input data or directed input data using registration data identifying one or more AR applications of the AR system, the registration data including an ID field identifying a target AR application, a registered language field identifying a language model to be associated with the target AR application, the gesture identification, and one or more symbols;

in response to classifying the input event data as undirected input data, routing, by the one or more processors, the input event data to an operating system level component of the AR system; and in response to classifying the input event data as directed input data, routing, by the one or more processors, the input event data to the target AR application.

9. The machine of claim 8, wherein the input event data comprises gesture input data of a gesture being made by a user of the AR system.

10. The machine of claim 8, wherein the input event data comprises symbol input data of a fingerspelling sign being made by a user of the AR system.

11. The machine of claim 9, wherein the input event data is generated by a hand-tracking input pipeline of the AR system.

12. The machine of claim 8, wherein the input event data comprises a voice command being made by a user of the AR system.

13. The machine of claim 12, wherein the input event data is generated by a voice input pipeline of the AR system.

14. The machine of claim 13, wherein the voice input pipeline comprises a voice Machine Learning (ML) service.

15. A non-transitory machine-storage medium storing executable instructions that, when executed by a machine, cause the machine to perform operations comprising:

generating, by one or more processors, input event data using input data captured by an input device of an Augmented Reality (AR) system, the input event data comprising symbol input data and gesture input data, the gesture input data determined using a gesture identification comprising one or more hand classifiers;

classifying, by the one or more processors, the input event data as undirected input data or directed input data using registration data identifying one or more AR applications of the AR system, the registration data including an ID field identifying a target AR application, a registered language field identifying a language model to be associated with the target AR application, the gesture identification, and one or more symbols;

in response to classifying the input event data as undirected input data, routing, by the one or more processors, the input event data to an operating system level component of the AR system; and in response to classifying the input event data as directed input data, routing, by the one or more processors, the input event data to the target AR application.

16. The machine-storage medium of claim 15, wherein the operations further comprise, wherein the input event data comprises gesture input data of a gesture being made by a user of the AR system.

17. The machine-storage medium of claim 15, wherein the operations further comprise, wherein the input event data comprises symbol input data of a fingerspelling sign being made by a user of the AR system.

18. The machine-storage medium of claim 16, wherein the operations further comprise, wherein the input event data is generated by a hand-tracking input pipeline of the AR system.

19. The machine-storage medium of claim 15, wherein the operations further comprise, wherein the input event data comprises a voice command being made by a user of the AR system.

20. The machine-storage medium of claim 19, wherein the operations further comprise, wherein the input event data is generated by a voice input pipeline of the AR system.

21. The machine-storage medium of claim 20, wherein the operations further comprise, wherein the voice input pipeline comprises a voice Machine Learning (ML) service.

\* \* \* \* \*